(12) United States Patent
Masuda et al.

(10) Patent No.: US 10,445,189 B2
(45) Date of Patent: Oct. 15, 2019

(54) INFORMATION PROCESSING SYSTEM, INFORMATION PROCESSING APPARATUS, AND INFORMATION PROCESSING APPARATUS CONTROL METHOD

(71) Applicant: FUJITSU LIMITED, Kawasaki-shi, Kanagawa (JP)

(72) Inventors: Kouji Masuda, Nagoya (JP); Akimasa Yoshida, Nagoya (JP); Kazunori Kobashi, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 628 days.

(21) Appl. No.: 15/133,253

(22) Filed: Apr. 20, 2016

(65) Prior Publication Data
US 2016/0371151 A1 Dec. 22, 2016

(30) Foreign Application Priority Data

Jun. 18, 2015 (JP) ................................. 2015-123243

(51) Int. Cl.
*G06F 7/00* (2006.01)
*G06F 17/30* (2006.01)
(Continued)

(52) U.S. Cl.
CPC .......... *G06F 11/1451* (2013.01); *G06F 3/061* (2013.01); *G06F 3/065* (2013.01); *G06F 3/067* (2013.01); *G06F 3/0619* (2013.01); *G06F 3/0647* (2013.01); *G06F 3/0689* (2013.01); *G06F 11/00* (2013.01); *G06F 11/1464* (2013.01); *G06F 16/119* (2019.01); *G06F 16/214* (2019.01); *G06F 16/2365* (2019.01); *G06F 16/27* (2019.01); *G06F 16/955* (2019.01);
(Continued)

(58) Field of Classification Search
CPC ............. G06F 17/30079; G06F 17/303; G06F 16/119; G06F 16/214; G06F 11/1451; G06F 16/955; G06F 16/27
See application file for complete search history.

(56) References Cited

U.S. PATENT DOCUMENTS

2005/0055402 A1* 3/2005 Sato ........................ H04L 29/06
709/205
2005/0060356 A1 3/2005 Saika
(Continued)

FOREIGN PATENT DOCUMENTS

JP 2005-092282 4/2005
JP 2010-049488 3/2010

*Primary Examiner* — Kannan Shanmugasundaram
(74) *Attorney, Agent, or Firm* — Fujitsu Patent Center

(57) ABSTRACT

A metadata processing unit acquires the first metadata from a first data storing unit at a first frequency and makes a second data storing unit store the first metadata. A file data processing unit specifies, based on the update history of the first metadata, second metadata that is updated on and after the last acquisition date and time of second file data stored in the second data storing unit, acquires the first file data associated with the specified management data at a second frequency that is lower than the first frequency, and makes the second data storing unit store the first file data. A switching unit switches a read/write process that is performed by using the operation data stored in the first data storing unit such that the read/write process is performed by using the second metadata and the second file data in the second data storing unit.

8 Claims, 18 Drawing Sheets

(51) Int. Cl.
*G06F 11/14* (2006.01)
*G06F 3/06* (2006.01)
*G06F 16/27* (2019.01)
*G06F 16/955* (2019.01)
*G06F 16/23* (2019.01)
*G06F 16/11* (2019.01)
*G06F 16/21* (2019.01)
*G06F 11/00* (2006.01)
G06F 17/00 (2019.01)

(52) U.S. Cl.
CPC .... *G06F 2201/80* (2013.01); *G06F 2201/835* (2013.01)

(56) References Cited

U.S. PATENT DOCUMENTS

| | | | |
|---|---|---|---|
| 2005/0102289 A1* | 5/2005 | Sonoda | G06F 17/30067 |
| 2006/0259724 A1 | 11/2006 | Saika | |
| 2009/0300081 A1* | 12/2009 | Ueoka | G06F 17/30079 |
| 2010/0049754 A1 | 2/2010 | Takaoka et al. | |
| 2011/0145197 A1* | 6/2011 | Kamohara | G06F 16/20 |
| | | | 707/647 |
| 2013/0117223 A1* | 5/2013 | Niki | G06F 17/30221 |
| | | | 707/610 |
| 2013/0339647 A1* | 12/2013 | Jindo | G06F 3/0617 |
| | | | 711/165 |

* cited by examiner

| No. | DATA CENTER IDENTIFICATION INFORMATION | APPLICATION POLICY |
|---|---|---|
| 1 | COUNTRY B DATA CENTER | POLICY #1 |
| 2 | COUNTRY C DATA CENTER | POLICY #2 |
| 3 | COUNTRY D DATA CENTER | POLICY #2 |
| 4 | COUNTRY E DATA CENTER | POLICY #3 |

| | META SYNCHRONIZATION FREQUENCY | DATA SYNCHRONIZATION FREQUENCY | NUMBER OF DATA CENTERS THAT APPLIES POLICY |
|---|---|---|---|
| POLICY #1 | PERFECT SYNCHRONIZATION | HIGH | 1 |
| POLICY #2 | HIGH | HIGH | 2 |
| POLICY #3 | HIGH | MEDIUM | 1 |

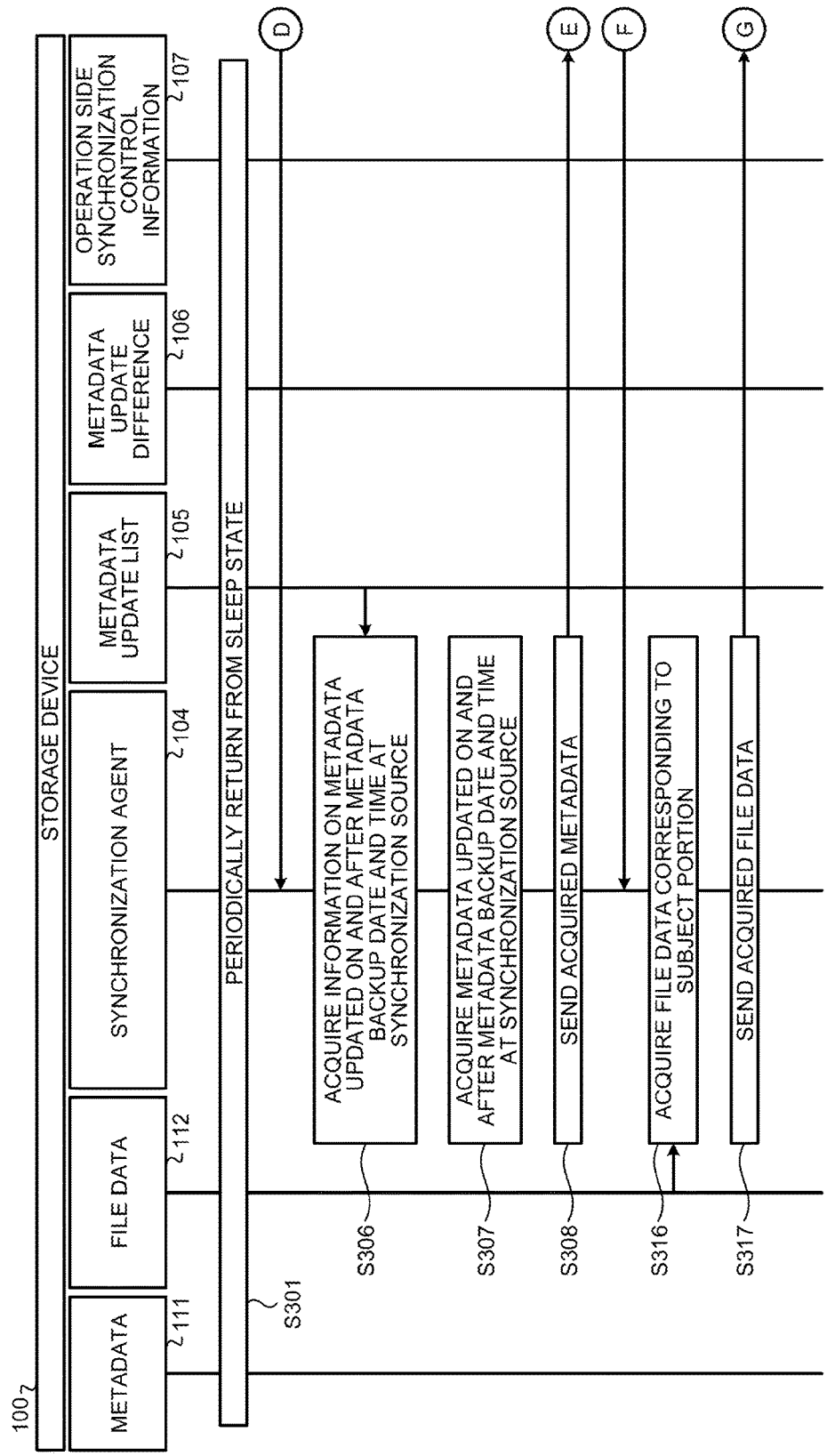

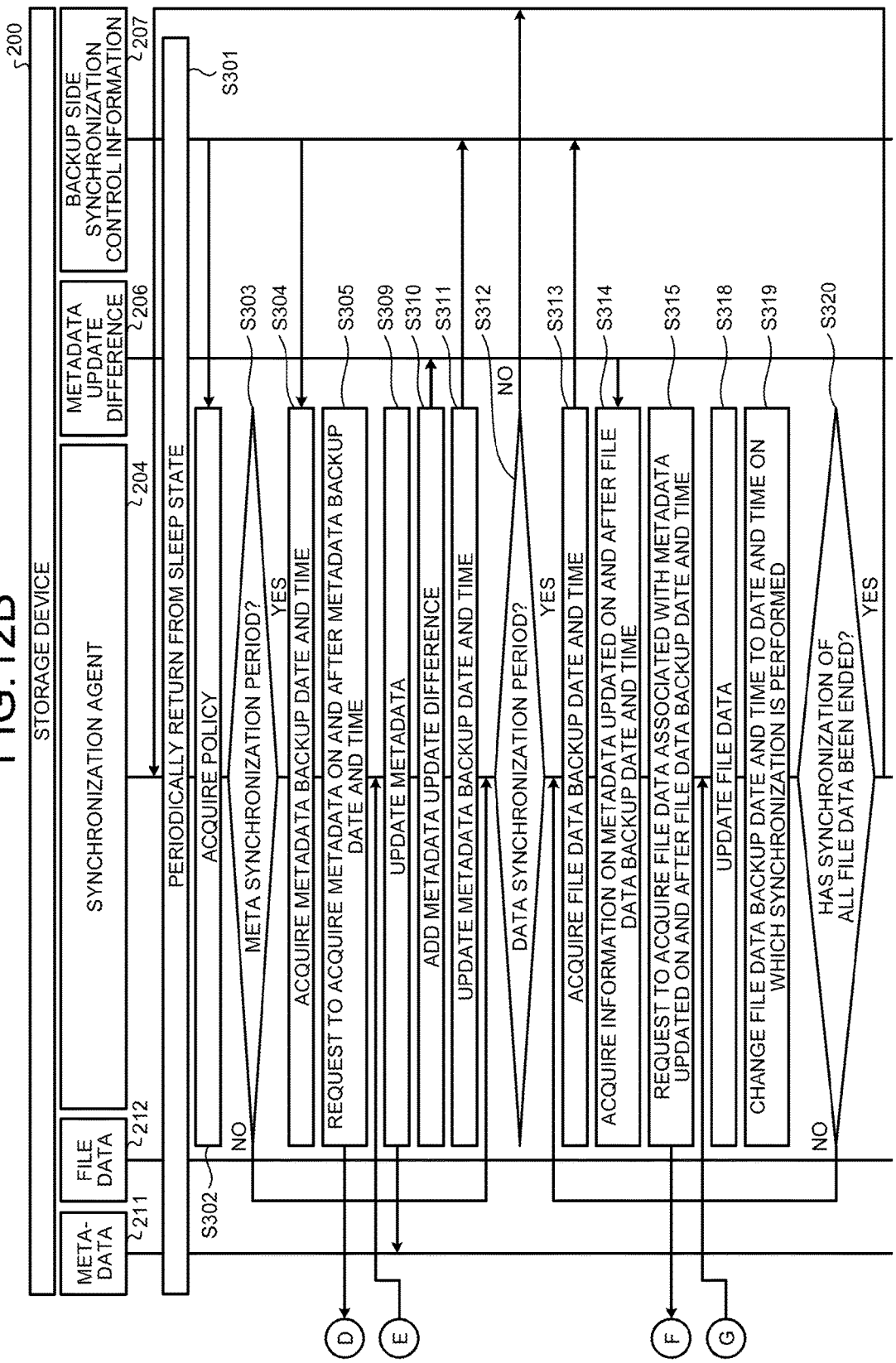

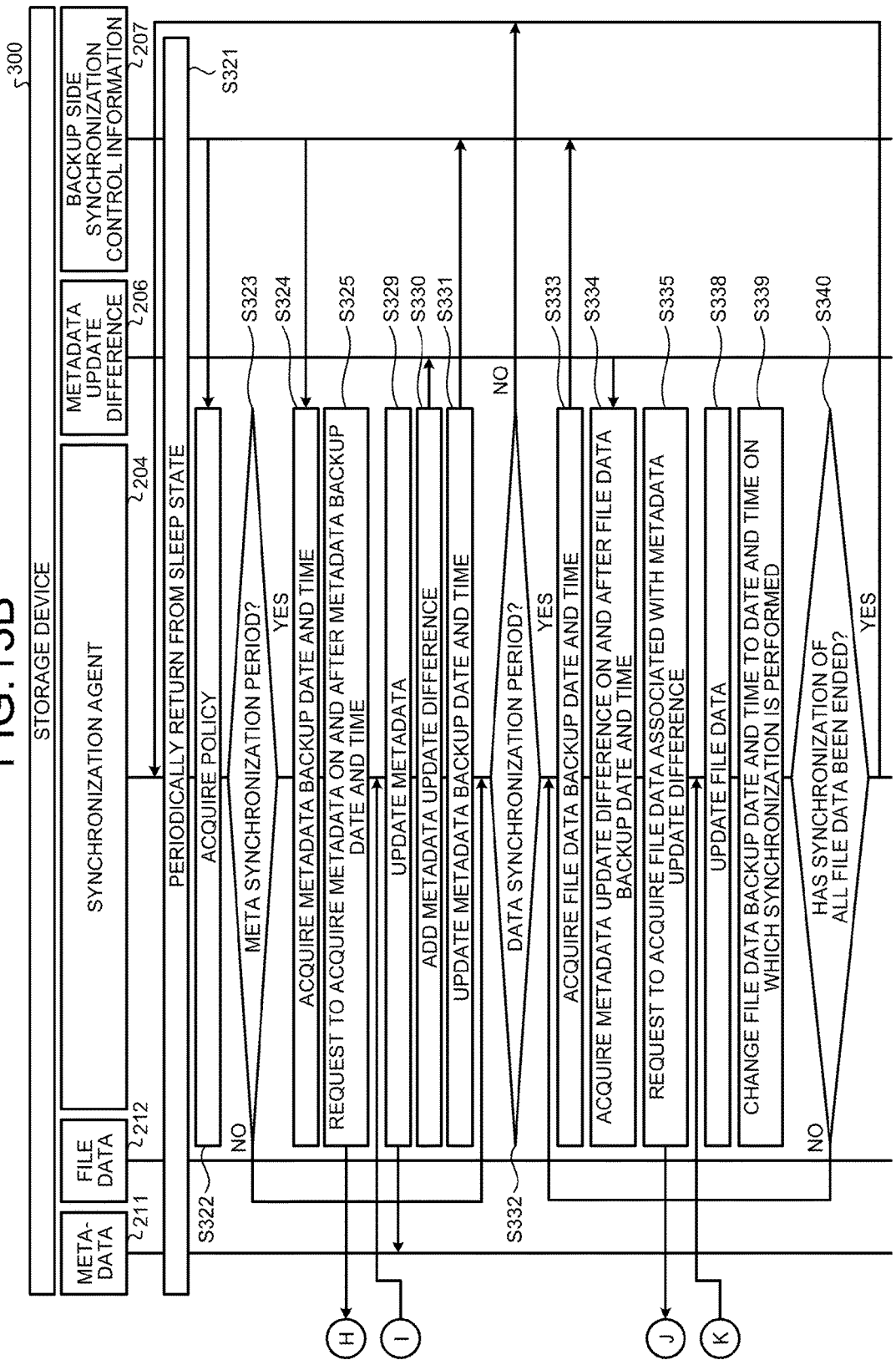

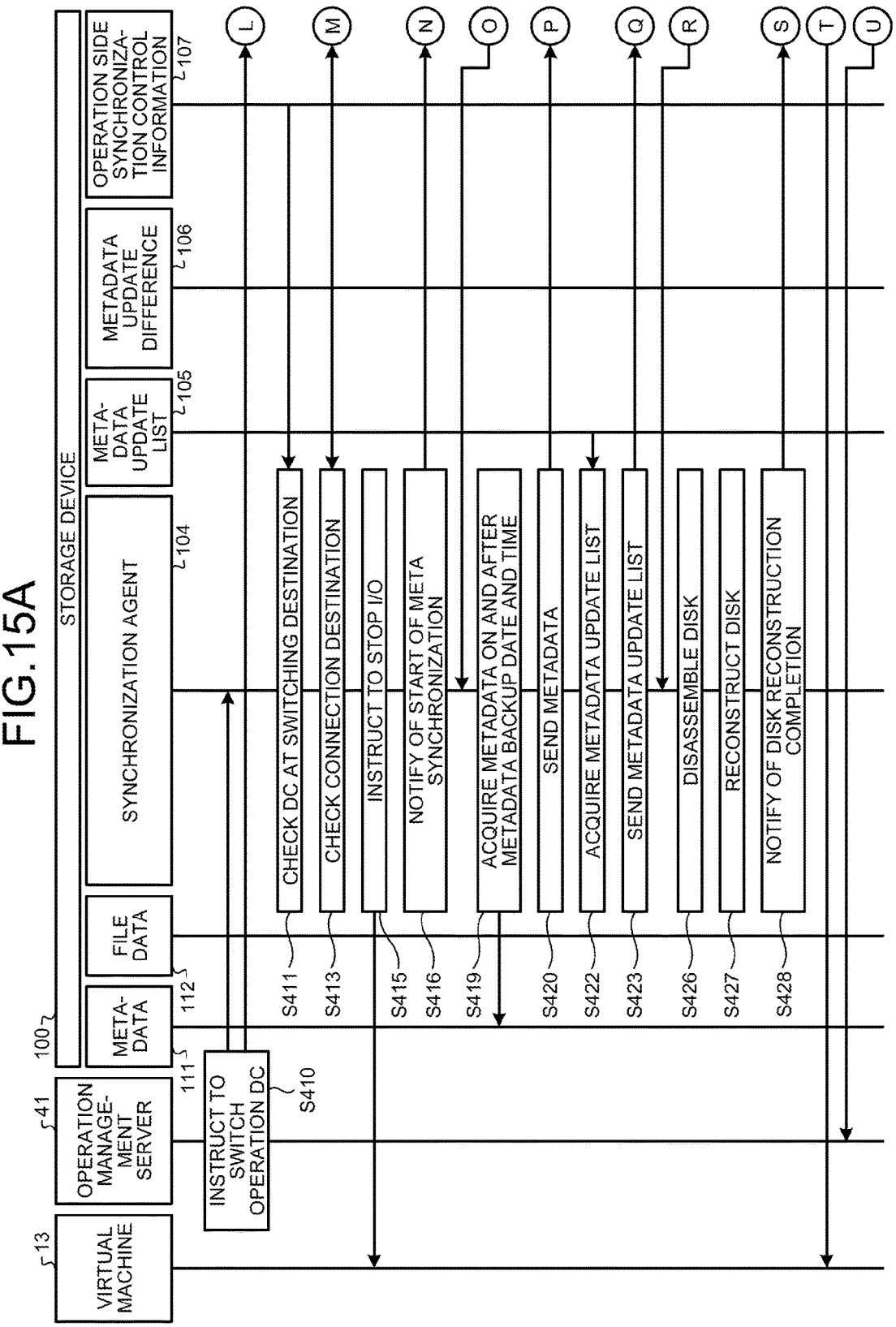

INFORMATION PROCESSING SYSTEM, INFORMATION PROCESSING APPARATUS, AND INFORMATION PROCESSING APPARATUS CONTROL METHOD

CROSS-REFERENCE TO RELATED APPLICATION

This application is based upon and claims the benefit of priority of the prior Japanese Patent Application No. 2015-123243, filed on Jun. 18, 2015, the entire contents of which are incorporated herein by reference.

FIELD

The embodiment discussed herein is directed to an information processing system, an information processing apparatus, and an information processing apparatus control method.

BACKGROUND

In recent years, with the popularization of cloud computing, each company increasingly uses resources in data centers provided by cloud service business providers, instead of having company's resources, such as servers, storage, or the like. Furthermore, as the type of data centers, a case is also increased, in which data centers are installed across a plurality of countries instead of remaining in a single country.

Furthermore, in data centers, it is desirable to implement an outsourcing service (hereinafter, referred to as a "one stop service") that has a function of providing various kinds of services at one stop without receiving geographical and physical constraints. The one stop mentioned here indicates a state in which various services can be received at a single location. To implement the one-stop service, for example, it is considered to use a system constituted on the basis of a concept in which service management, operation, service platform, facilities, networks, or the like are integrated and on the basis of standardized service management.

Furthermore, in the one-stop service, it is desirable to efficiently operate and manage systems distributed in a plurality of countries or regions. With this configuration, it is preferable to construct a mechanism in which the operation level of a data center is not decreased even at the time of deterioration in the security situation of the country in which a data center is operated.

As an outsourcing service provided by a data center, for example, there is a system in which a plurality data centers are accommodated and an outsourcing service provider determines, in accordance with a use mode of a customer, a data center to operate a service. The customer simply uses the service provided from the data center and does not need to have a consciousness that a virtual machine that provides the service is operated in which one of data centers.

Furthermore, in each of the data centers, in order to provide an efficient service, there may be a case of monitoring the state of each of the virtual machines and moving the service to an appropriate data center in accordance with the nature or the intended purpose of the customer or in accordance with the operation state of the data center. For one thing, a data center is moved due to customer's convenience. For example, if the main communication path for the customer is changed and the line path is reviewed, it is conceivable that, for convenience of communication path, the service is moved to the data center in which the line speed is advantageous. Furthermore, as another circumstance, the data center is moved due to provider's convenience. For example, if a new data center is established or if a data center that provides a service is reviewed due to a trouble, it is conceivable that the service is moved to the newly established data center or the other data center by taking into consideration the service level provided to the customer is not decreased. Hereinafter, a move of a service from a certain data center to the other data center is referred to as "migration". Then, in both cases, it is important to flexibly and rapidly relocate data and switch the service to the data center at the migration destination.

Here, there may be a case in which, in the one-stop service, a plurality of data centers is present. In such a case, it is preferable that, in order to meet the demand of a customer, a service provider allocates the provided service to an appropriate data center and flexibly changes the data center in accordance with the circumstances.

Therefore, it is conceivable to use a method that secures data related to services provided by a certain data center in the other data center as a backup and, when migration is actually performed, by using the subject backup data, the service is moved to the other data center. Then, as a technique that backs up data between the data centers, there is a method of performing a normal backup in which a copy of data is acquired at certain intervals and there is another method of copying the same data content into the other disk. In a description below, the latter method is referred to as mirroring. There are two types of mirroring, i.e., the perfect synchronization mirroring in which, in order to obtain the same content of the original data, an update of data is not enabled until both the original data and the data in the mirroring destination have been completely updated and asynchronous mirroring in which an update of data is enabled without waiting for the completion of the update in the mirroring destination.

Here, as a backup technology of data, there is a conventional technology, in which metadata is written at the reference time point of a backup and, if a write occurs before the next reference time point, data is written in time series after the metadata. Furthermore, there is a conventional technology that sets an identifier that indicates the type of data in both the metadata targeted for the backup and the file and that determines a backup destination server in accordance with the identifier, and sends the file.

Patent Document 1: Japanese Laid-open Patent Publication No. 2010-49488

Patent Document 2: Japanese Laid-open Patent Publication No. 2005-92282

However, with a normal backup, a certain interval is present for the backup acquisition. Consequently, although the effect on the data update performance is small, a difference occurs in operation data depending on the time difference after the acquisition. Furthermore, in the synchronization mirroring, the completeness of data is guaranteed; however, a data update cost is high and the response performance of the system tends to be decreased. Furthermore, in the asynchronous mirroring, the effect on the data response performance is decreased; however, it is difficult to guarantee the completeness of data. In this way, the timing of the data synchronization between the backup source and the backup destination and the cost needed for a backup has a tradeoff relationship. Thus, in order to implement flexible migration, it is preferable to perform a backup at high speed in order to guarantee the completeness of the data while reducing the cost.

However, even if a high speed backup is implemented, if the backup destination is only one, the number of options of the migration destination is decreased. Thus, it is conceivable that a backup is performed in a plurality of places; however, the cost of the backup is increased in accordance with the increase in the backup destination.

Furthermore, even if the conventional technology that writes data in time series after the metadata that was written at the reference time point is used, because the backup source is operation data, if a backup is performed in a plurality of places, the load of the data center that provides the service is increased and it is difficult to reduce the cost. Furthermore, even if the conventional technology that determines the backup destination by using the identifier that indicates the type of data is used, because the backup source is operation data, if a backup is performed in a plurality of places, the load of the data center that provides the service is increased and it is difficult to reduce the cost.

SUMMARY

According to an aspect of an embodiment, a information processing system includes: a first information processing apparatus; a second information processing apparatus; and an operation management device, wherein the first information processing apparatus includes a first storing unit that stores therein operation data in which management data that includes therein update date and time and actual data that is associated with the management data are held, the second information processing apparatus includes a second storing unit, and a first management data acquiring unit that acquires the management data from the first storing unit at a first frequency and that makes the second storing unit store the acquired management data, and a first actual data acquiring unit that specifies, on the basis of an update history of the management data acquired by the first management data acquiring unit, the management data that is updated on and after the last acquisition date and time of the actual data stored in the second storing unit, that acquires the actual data associated with the specified management data from the first storing unit at a second frequency that is lower than the first frequency, and that makes the second storing unit store the acquired actual data, and the operation management device includes a switching unit that switches a read and write process that is performed by using the operation data stored in the first storing unit such that the read and write process is performed by using the management data and the actual data that are stored in the second storing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a schematic diagram illustrating an example of a priority management table;

FIG. 8 is a schematic diagram illustrating an example of policy definition table;

FIG. 12A is a sequence diagram illustrating a process performed by the operation storage device and the standby storage device at the time of regular synchronization;

FIG. 12B is a sequence diagram illustrating a process performed by the operation storage device and the standby storage device at the time of regular synchronization;

FIG. 13B is a sequence diagram illustrating a process performed by the standby storage devices at the time of regular synchronization;

FIG. 15A is a sequence diagram illustrating a process performed by the operation storage device and the standby storage device when migration is performed.

DESCRIPTION OF EMBODIMENT

Preferred embodiments of the present invention will be explained with reference to accompanying drawings. The information processing system, the information processing apparatus, and the information processing apparatus control method disclosed in the present invention is not limited to the embodiment described below.

Figure 1:
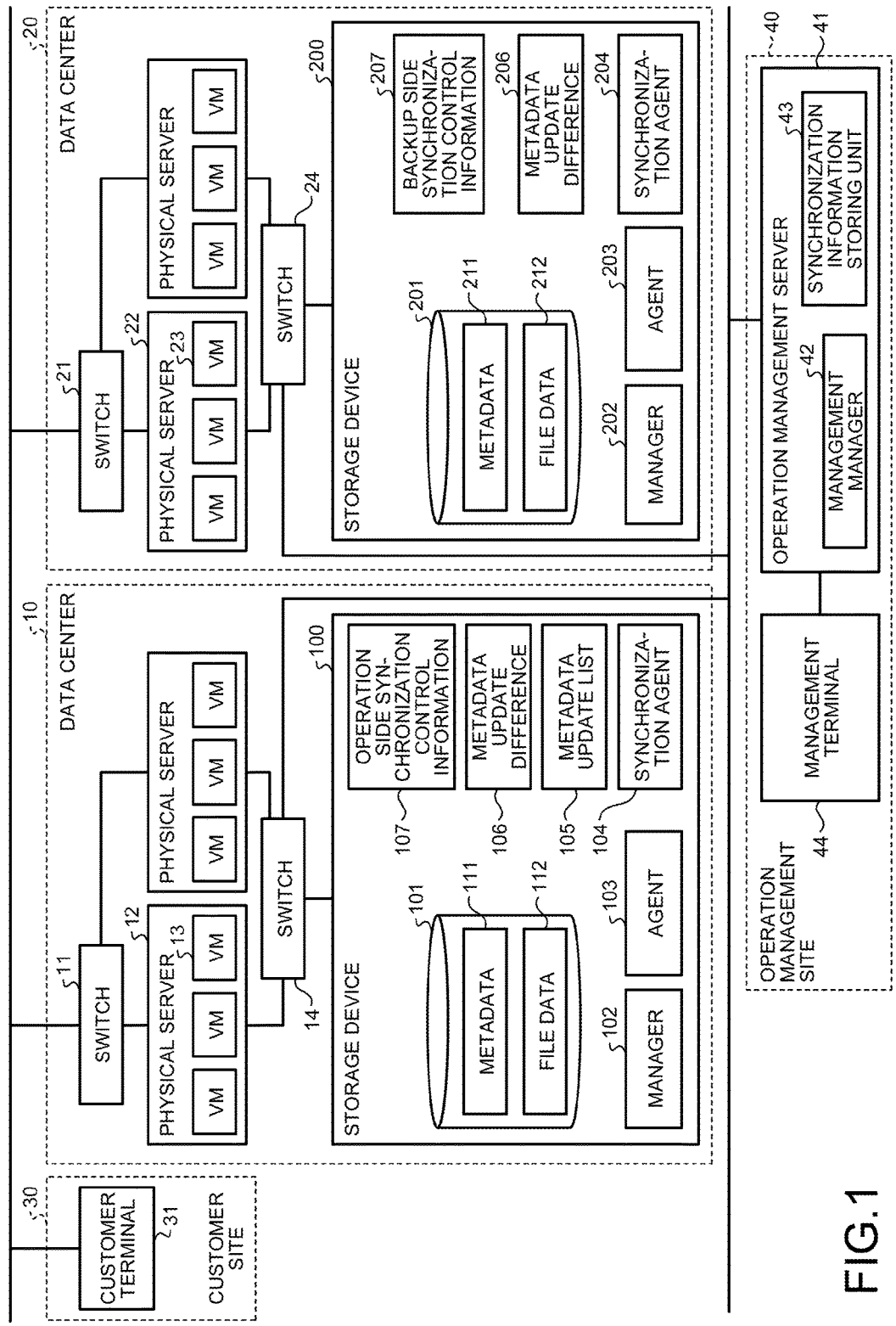
FIG. 1 is a schematic diagram illustrating, in outline, the configuration of an information processing system according to an embodiment.

FIG. 1 is a schematic diagram illustrating, in outline, the configuration of an information processing system according to an embodiment. As illustrated in FIG. 1, the information processing system according to the embodiment includes data centers 10 and 20, a customer site 30, and an operation management site 40. Each of the data centers 10 and 20 provides a plurality of services, such as databases or the like. In a description below, a process related to providing of a predetermined service from among the services that are provided by the data centers 10 and 20.

The data center 10 is a data center on the side that provides a predetermined service to a customer site. In a description below, the data center on the side that provides a predetermined service is referred to as an "operation side data center". Furthermore, the data center 20 does not provide a predetermined service and holds a backup of data for providing the predetermined service. Then, when providing of the predetermined service from the data center 10 is stopped, the data center 20 becomes a data center that is a candidate for the switching destination of the providing of the predetermined service instead of the data center 10. In a description below, the data center that holds a backup and that becomes a candidate for the switching destination of the providing of the service is referred to as a "standby data center". However, here, because the predetermined service is focused on, the roles of the data centers 10 and 20 are those described above; however, for the other services, the roles may possibly be inverted. Furthermore, in FIG. 1, only the two data centers 10 and 20 are illustrated; however, another data center may also be present.

The data center 10 includes a switch 11, physical servers 12, a switch 14, and a storage device 100.

The switch 11 is a switch that relays communication between the physical servers 12 and an external device. In this way, each of the physical servers 12 performs communication with the other device via the switch 11; however, in a description below, for convenience of explanation, there may sometimes be a case in which the switch 11 is omitted and each of the physical servers 12 directly performs communication with the other device.

Each of the physical servers 12 is a computer that includes a CPU, a memory, or the like. In each of the physical servers 12, a plurality of virtual machines (VMs) 13 is operated. Here, the number of the virtual machines 13 is not particularly limited and one or a plurality of virtual machines 13 may also be used. Furthermore, in the embodiment, each of the virtual machines 13 provides a service to the customer site 30. Namely, when viewed from a customer terminal 31, communication is seemingly performed with the virtual machine 13 instead of the physical server 12. In this way, the physical server 12 actually performs communication or a process; however, it can be said that the virtual machine 13 virtually performs the process; therefore, in a description below, there may sometimes be a case in which the virtual machine 13 performs communication or a process.

The switch 14 is a switch that mediates the physical servers 12 and that mediates the communication among the physical servers 12, the storage device 100, and an operation management server 41. In a description below, there may sometimes be a case in which mediation of the communication performed by the switch 14 is omitted.

The storage device 100 includes, although not illustrated, a central processing unit (CPU), a memory, and a hard disk. The hard disk stores therein various kinds of programs including a program that implements the function described below. Then, the CPU reads the various kinds of programs stored in the hard disk, loads the read programs in the memory, and executes the program, thereby implementing the function described below.

The storage device 100 includes a data storing unit 101 that is implemented by a hard disk. The data storing unit 101 mentioned here corresponds to an example of a "first storing unit". The data storing unit 101 holds metadata 111 and file data 112. The metadata 111 and the file data 112 are data for providing a predetermined service. Specifically, the file data 112 is the content of data itself. The file data 112 mentioned here corresponds to an example of "actual data". The metadata 111 holds supplementary information for data management, such as allocation location of the file data 112, an owner, the last update date and time, or the like. The metadata 111 mentioned here corresponds to an example of "management data". Namely, the metadata 111 and the file data 112 held by the storage device 100 is data that is used to provide a service to the customer terminal 31 performed by the virtual machine 13. In a description below, the storage device on the side that provides a predetermined service is referred to as an "operation storage device".

Furthermore, the storage device 100 stores, in the hard disk, a metadata update list 105, a metadata update difference 106, and operation side synchronization control information 107 that are information used to control a backup and migration. The metadata update list 105, the metadata update difference 106, and the operation side synchronization control information 107 will be described in detail later.

Furthermore, in the storage device 100, a manager 102, an agent 103, and a synchronization agent 104 that are implemented by the CPU executing programs are operated. The manager 102 constructs or manages the environment for operation of the storage device 100, such as the setting of RAID (redundant arrays of inexpensive disks) with respect to a hard disk included in the storage device 100.

Furthermore, the agent 103 performs control of a process of reading and writing data in the storage device 100. Furthermore, when a storage device 200 performs a backup, the synchronization agent 104 performs the process on the operation storage device side. The synchronization agent 104 will be described in detail later. The synchronization mentioned here is a process of matching data and has the same meaning of a backup. Accordingly, in a description below, synchronization and a backup are used as the same meaning.

The data center 20 includes a switch 21, physical servers 22, a switch 24, and the storage device 200. The switch 21, the physical servers 22, and the switch 24 have the same function as that performed by the switch 11, the physical servers 12, and the switch 14 in the data center 10. Furthermore, a virtual machines 23 operated in the physical servers 22 have the same function as that performed by the virtual machines 13 in the data center 10. However, the virtual machines 23 do not provide a predetermined service to the customer terminal 31.

The storage device 200 also includes, although not illustrated, a CPU, a memory, and a hard disk. The hard disk stores therein various kinds of programs including a program that implements the function described below. Then, the CPU reads the various kinds of programs stored in the hard disk, loads the read programs in the memory, and executes the program, thereby implementing the function described below.

The storage device 200 includes a data storing unit 201 that is implemented by a hard disk. The data storing unit 201 mentioned here corresponds to an example of a "second storing unit". The data storing unit 201 holds metadata 211 and file data 212. The metadata 211 and the metadata 111 are backup data. Furthermore, the file data 212 is backup data of the file data 112. A method of the backup will be described in detail later. In a description below, the storage device that holds backup data for providing a predetermined service is referred to as a "standby storage device".

Furthermore, the storage device 200 includes, in the hard disk, a metadata update difference 206 and backup side synchronization control information 207 that are information used to control a backup and migration. The metadata update difference 206 and the backup side synchronization control information 207 will also be described in detail later.

Furthermore, in the storage device 200, a manager 202, an agent 203, and a synchronization agent 204 that are implemented by the CPU executing programs are operated. The manager 202 and the agent 203 have the same function as that performed by the manager 102 and the agent 103 in the storage device 100, respectively.

The synchronization agent 204 performs a process on the standby storage side when the storage device 200 performs a backup. The synchronization agent 204 will be described in detail later.

Furthermore, if data synchronization is not performed between the operation storage device (for example, the storage device 100) and the standby storage device (for example, the storage device 200) at the time of, for example, the start of a system operation, initial synchronization is performed between the storage devices 100 and 200. Then, in the storage devices 100 and 200, a regular synchronization process for synchronizing the content of the metadata 111 and the file data 112 is performed. Furthermore, when the providing source of a predetermined service is switched from the storage device 100 to the storage device 200, a migration process is performed.

The operation management site 40 includes a management terminal 44 and the operation management server 41. The operation management server 41 and the management terminal 44 are connected such that data can be sent and received.

The management terminal 44 is an interface with respect to the operation management server 41 of an administrator in the data centers 10 and 20. The management terminal 44 receives an input of information that is used to manage the data centers 10 and 20 from the administrator and outputs the information to the operation management server 41. Furthermore, the management terminal 44 receives an input of information related to, for example, the results of control of the data centers 10 and 20 from the operation management server 41.

The operation management server 41 includes, although not illustrated, a CPU, a memory, and a hard disk. The hard disk stores therein various kinds of programs including a program that implements the function described below. Then, the CPU reads the various kinds of programs stored in the hard disk, loads the read programs in the memory, and executes the program, thereby implementing the function described below. The operation management server 41 operates and manages the data centers 10 and 20 by using the information that is input from the management terminal 44.

Specifically, the operation management server 41 includes a management manager 42 and a synchronization information storing unit 43. The synchronization information storing unit 43 holds various kinds of information that are used for a backup between the storage devices 100 and 200. The management manager 42 uses the information stored in the synchronization information storing unit 43 and performs overall management of a backup between the storage devices 100 and 200.

The customer site 30 includes the customer terminal 31 that is a computer. A customer connects, by using the customer terminal 31, to the virtual machine 13 functioning as a business server and receives a predetermined service that is provided. The customer terminal 31 outputs information input from the customer to the virtual machine 13. Furthermore, the customer terminal 31 provides the information input from the virtual machine 13 to the customer by, for example, displaying the information on a monitor.

Figure 2:
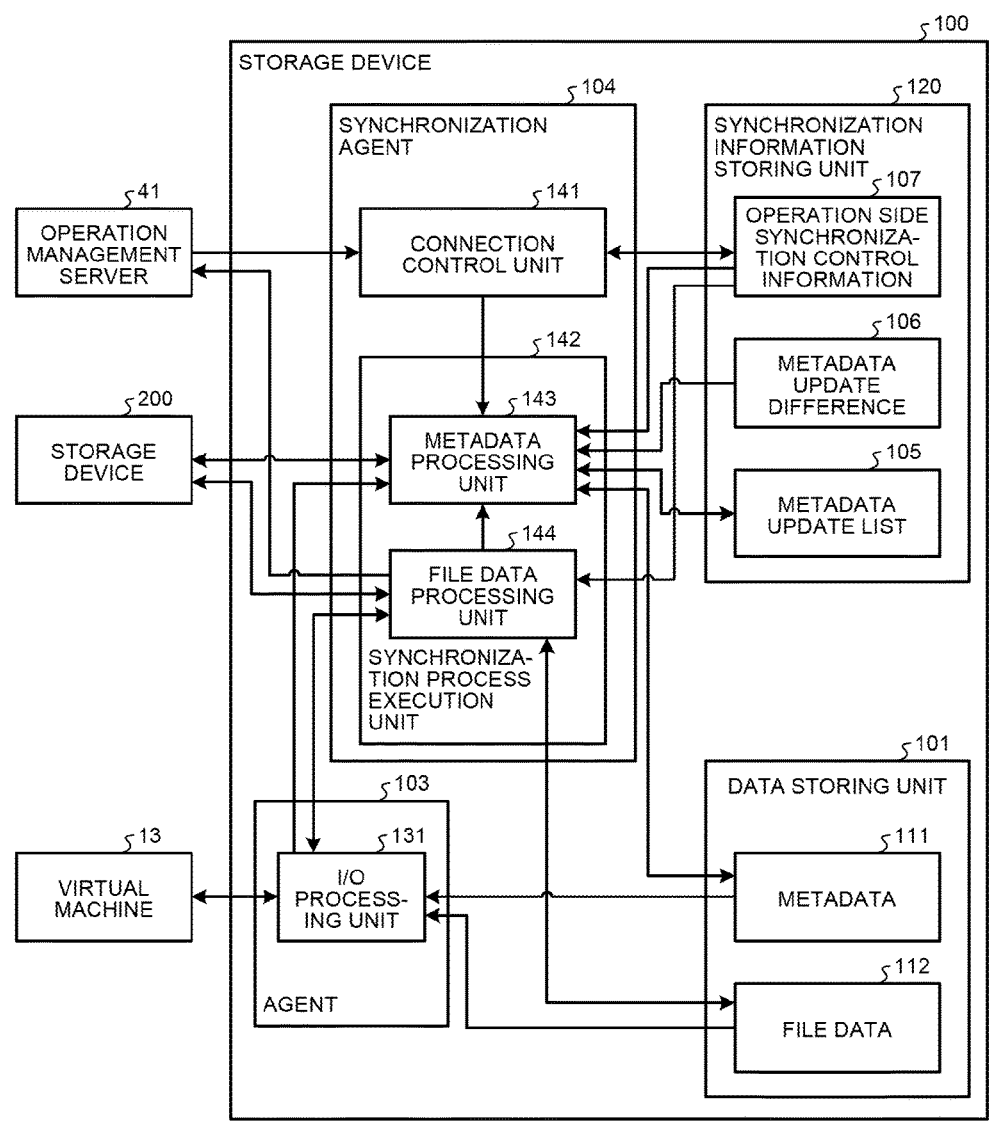
FIG. 2 is a block diagram illustrating an operation storage device.
Figure 3:
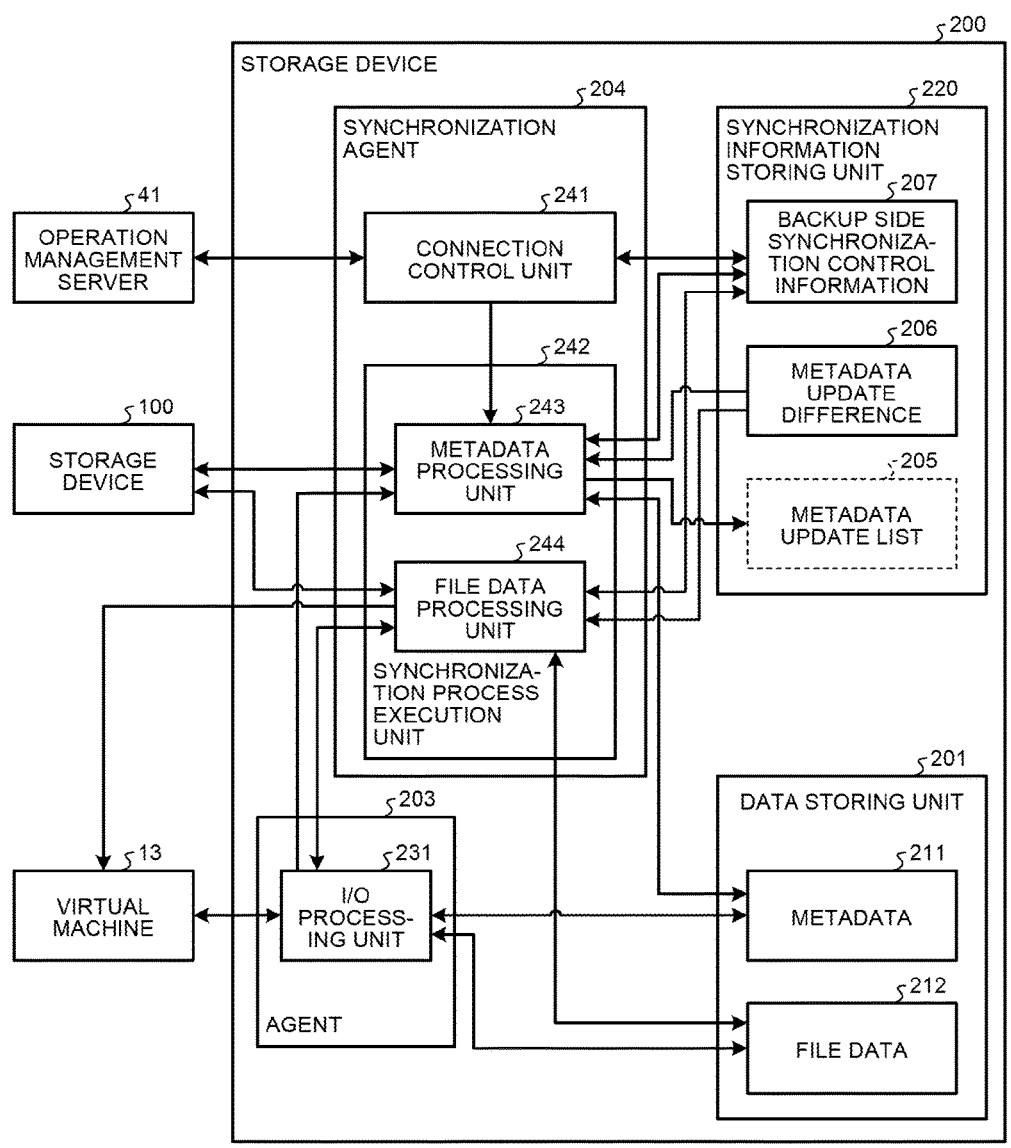
FIG. 3 is a block diagram illustrating a standby storage device.

In the following, the functions related to an I/O process, a backup process, and a migration process performed by the storage devices 100 and 200 will be described with reference to FIGS. 2 and 3. FIG. 2 is a block diagram illustrating an operation storage device. Furthermore, FIG. 3 is a block diagram illustrating a standby storage device. Here, the managers 102 and 202 illustrated in FIG. 1 are not used for a description at this point; therefore, the managers 102 and 202 are omitted in FIGS. 2 and 3.

The data storing unit 101 is a storage device that holds the metadata 111 and the file data 112. Furthermore, the metadata update list 105, the metadata update difference 106, and the operation side synchronization control information 107 are stored in a synchronization information storing unit 120. The synchronization information storing unit 120 is implemented by a hard disk. Here, the data storing unit 101 and the synchronization information storing unit 120 may also be stored in the same hard disk or may also be stored in different hard disks.

Figure 4:
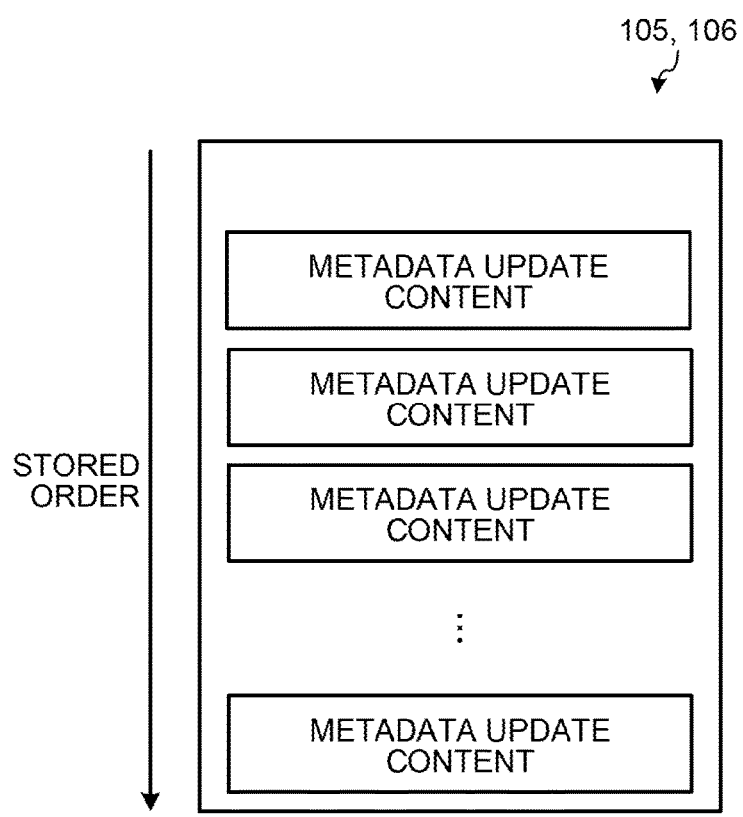
FIG. 4 is a schematic diagram illustrating a metadata update list and the data storing state of a metadata update difference.

If the metadata 111 is updated in the operation storage device due to an instruction from the virtual machine 13 that is the business server, the metadata update list 105 stores, as illustrated in FIG. 4, the metadata update content that indicates the updated contents of each of the pieces of the metadata 111 in the order the pieces of the metadata 111 are updated. FIG. 4 is a schematic diagram illustrating a metadata update list and the data storing state of a metadata update difference. The arrow illustrated on the left side in FIG. 4 indicates the order the pieces of the metadata update content are stored. Namely, FIG. 4 illustrates the pieces of metadata update content that are newly stored in a downward direction. Because the pieces of metadata update content are stored in the order the content are updated, the store order also indicates the order the metadata 111 is updated. Accordingly, the metadata update list 105 indicates that the metadata 111 that is associated with the metadata update content and that is stored last is the latest updated content. The metadata update list 105 mentioned here is an example of an "operation data update history saving unit".

Similarly to the metadata update list 105, the metadata update difference 106 also stores therein data in the form illustrated in FIG. 4. If the metadata 111 is updated when a backup is performed, the metadata update difference 106 stores the metadata update content in the order the pieces of the metadata update content are updated.

The metadata update content stores therein, for example, the list ID, the update date and time, the update target file, the type of update metadata, the content before an update, the content after the update, or the like. The list ID is a number for the arrangement of the metadata update content. For example, the list ID is managed by a large value, such as unsigned 64 bits. The update date and time is represented by time using year, month, date, time, minute, second, and microsecond. This update date and time is used to determine whether metadata is targeted for a backup, as described later.

The update target file is information for specifying the metadata 111 that is targeted for an update. The update target file is managed by a file name or an i node number including the path for the metadata 111. The type of update metadata is a type that indicates which one of the metadata 111 has been changed. For example, the type of update metadata is represented by an owner, a file name, or the like of the metadata 111. The content before the update is, for the type of the updated metadata 111, the content recorded in the target type in the metadata 111 before the update. The content after the update is the updated content in the type of the updated metadata 111.

However, these are an example of data stored as the metadata update content and may also be changed by the update content of the metadata 111 and the file data 112. For example, if the size of the file data 112 is changed, the size before and after the update may also be registered as the metadata update content.

Figure 5A:
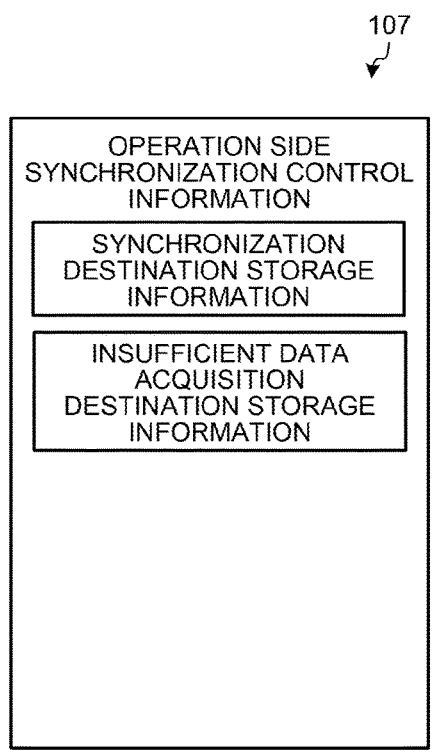
FIG. 5A is a schematic diagram illustrating operation side synchronization control information.

FIG. 5A is a schematic diagram illustrating operation side synchronization control information. As illustrated in FIG. 5A, the operation side synchronization control information 107 stores therein synchronization destination storage information and insufficient data acquisition destination storage information. The synchronization destination storage information stores therein connection information on the storage device in which the metadata 111 is synchronized and the synchronization policy of each of the synchronization destinations. Here, the storage device 200 corresponds to the synchronization destination storage information. Furthermore, the synchronization policy includes the frequency of synchronization. The insufficient data acquisition destination storage information is information that is related to the storage at the connection destination and that is used to obtain insufficient information if all of the pieces of information have not yet been synchronized in the storage device 100, i.e., the operation storage device because the providing source of a predetermined service was switched in the past due to migration.

The agent 103 includes an I/O processing unit 131. The I/O processing unit 131 receives a write instruction and a read instruction from the virtual machine 13 that is a business server. Then, if the I/O processing unit 131 receives a read instruction, the I/O processing unit 131 reads the metadata 111 and the file data 112 of the specified data from the data storing unit 101. Then, the I/O processing unit 131 outputs the read metadata 111 and the file data 112 to the virtual machine 13.

Furthermore, if the I/O processing unit 131 receives a write instruction, the I/O processing unit 131 notifies a metadata processing unit 143 that the write instruction has been received. Then, the I/O processing unit 131 acquires the information on an update difference from the metadata processing unit 143. Then, the I/O processing unit 131 updates the metadata 111 in accordance with the acquired update difference.

Furthermore, if an update of the file data 112 is present, the I/O processing unit 131 notifies a file data processing unit 144 of an update of the file data 112. Thereafter, if the latest file data 112 targeted for an update is present in the data storing unit 101, the I/O processing unit 131 receives an update instruction from the file data processing unit 144. Then, the I/O processing unit 131 updates the file data 112 stored in the data storing unit 101. In contrast, if the latest file data 112 targeted for an update is not present in the data storing unit 101, the I/O processing unit 131 receives an input of the latest file data 112 from the file data processing unit 144. Then, the I/O processing unit 131 updates the latest acquired file data 112 and then writes the updated file data 112 to the data storing unit 101.

Furthermore, when migration is performed, the I/O processing unit 131 receives a stop instruction of the I/O process from the metadata processing unit 143. Then, the I/O processing unit 131 notifies the virtual machine 13 of a stop of the I/O process. Then, after the completion of the migration, the I/O processing unit 131 receives an instruction to resume the I/O process from a file data processing unit 244 in the storage device 200 at the switching destination. Then, the I/O processing unit 131 notifies the virtual machine 13 that the I/O process is resumed.

The synchronization agent 104 includes a connection control unit 141 and a synchronization process execution unit 142. The connection control unit 141 controls a connection with the other storages at the time of backup and migration. The synchronization process execution unit 142 controls the acquisition and the writing of the metadata 111 and the file data 112 from the other storage device 200 at the time of backup and migration. In the following, the connection control unit 141 and the synchronization process execution unit 142 will be described in detail.

When information and the policy of synchronization at the synchronization destination is input to the operation management server 41 by an administrator by using the management terminal 44, the connection control unit 141 receives the information and the synchronization policy at the synchronization destination from the operation management server 41. Then, the connection control unit 141 stores the information and the synchronization policy at the synchronization destination in the operation side synchronization control information 107. Here, in the embodiment, as the backup destination, the storage device 200 is used as an example; however, a plurality of backup destinations may also be used. For example, the connection control unit 141 may also register, as the connection destination, the storage device 200 and the other storage device in the operation side synchronization control information 107 as the synchronization destination storage information. In this case, the policy of synchronization may also be different between the storage device 200 and the other storage device.

Furthermore, when the connection control unit 141 performs the initial synchronization, the connection control unit 141 receives a synchronization start instruction from the operation management server 41. Then, the connection control unit 141 acquires information on the connection destination from the operation side synchronization control information 107. Then, the connection control unit 141 performs communication with a connection control unit 241 in the storage device 200 that is the connection destination and checks the connection destination. When the connection destination is checked, the connection control unit 141 instructs the metadata processing unit 143 to start the synchronization.

Furthermore, when migration is performed, the connection control unit 141 previously receives, from the operation management server 41, an input of the information on the data center at the switching destination that becomes the switching destination of the providing source of a predetermined service, information on the synchronization destination after the switching, and the synchronization policy after the switching. Then, the connection control unit 141 registers, in the operation side synchronization control information 107, the information on the data center at the switching destination that becomes the switching destination of the providing source of a predetermined service, information on the synchronization destination after the switching, and the synchronization policy after the switching. Here, a description will be given of a case in which the switching destination data center is the data center 20.

When the migration is performed, the connection control unit 141 receives an instruction to switch the operation data centers from the operation management server 41. Then, the connection control unit 141 acquires the information on the data center 20 as the switching destination data center from the operation side synchronization control information 107. Then, the connection control unit 141 specifies the storage device 200 arranged in the data center 20 as the connection destination. Then, the connection control unit 141 performs communication with the connection control unit 241 in the storage device 200 that is the connection destination and checks the connection destination. If the connection control unit 141 has checked the connection destination, the connection control unit 141 instructs the metadata processing unit 143 to start migration to the storage device 200.

Furthermore, the connection control unit 141 receives a notification of the completion of the migration process from the file data processing unit 144. Then, the connection control unit 141 disassembles and reconstructs the hard disk. Namely, the connection control unit 141 releases the setting of synchronization with the other storage device performed by using the hard disk, as the operation storage device, that stores therein data that provides a predetermined service. Then, the connection control unit 141 newly sets synchronization with respect to the hard disk in which the data that provided the predetermined service until now.

The synchronization process execution unit 142 controls the synchronization process that is a backup. The synchronization process execution unit 142 includes the metadata processing unit 143 and the file data processing unit 144.

When the metadata processing unit 143 receives, at the time of the initial synchronization, an instruction to start the synchronization from the connection control unit 141, the metadata processing unit 143 starts the synchronization of the metadata 111. In a description below, the synchronization process of the metadata 111 is sometimes referred to as "meta synchronization". The metadata processing unit 143 acquires the metadata 111 stored in the data storing unit 101. Then, the metadata processing unit 143 sends the acquired metadata to the synchronization agent 204 in the storage device 200.

When the metadata processing unit 143 completes the sending of all of the pieces of the metadata 111 stored in the data storing unit 101, the metadata processing unit 143 notifies the synchronization agent 204 in the storage device 200 of the completion of the meta synchronization. Then, the metadata processing unit 143 receives a notification of the registration completion of the metadata backup date and time from the synchronization agent 204. Then, the metadata processing unit 143 instructs the file data processing unit 144 to perform the synchronization of the file data 112. In a description below, the synchronization process of the file data 112 is sometimes referred to as "data synchronization".

Furthermore, if the I/O process is performed, the metadata processing unit 143 receives a notification of the update of the metadata 111 from the I/O processing unit 131. Then, the metadata processing unit 143 determines whether the data update content of the metadata 111 that is targeted for the update is present in the metadata update content that remains in the metadata update difference 106. If the data update content of the metadata 111 targeted for the update is present, the metadata processing unit 143 merges the update content obtained this time with the update difference. Then, the metadata processing unit 143 updates the metadata 111 by using the merged update content. In contrast, if the data update content of the metadata 111 targeted for the update is not present, the metadata processing unit 143 updates the metadata 111 by using the update content obtained this time. Furthermore, the metadata processing unit 143 stores the updated update information in the metadata update list 105.

In the following, a description will be given of a case in which synchronization mirroring is performed on the metadata 111. After the metadata processing unit 143 updates the metadata 111, the metadata processing unit 143 acquires the synchronization destination of the meta synchronization from the operation side synchronization control information 107. If the synchronization destination is present, the metadata processing unit 143 sends the metadata 111 to a metadata processing unit 243 in the storage device 200 at the synchronization destination. Then, the metadata processing unit 143 receives a notification of the update completion of the metadata from the metadata processing unit 243 in the storage device 200 at the synchronization destination. Thereafter, the metadata processing unit 143 sends a completion notification of the update to the virtual machine 13. In contrast, if the synchronization destination is not present, the metadata processing unit 143 sends the completion notification of the update without processing anything to the virtual machine 13.

In contrast, when asynchronous mirroring is performed on the metadata 111, if it is a start timing of the meta synchronization, the metadata processing unit 143 specifies, from the metadata update list 105, the metadata 111 that is updated after the immediately previous timing until this the timing. Then, the metadata processing unit 143 acquires the specified metadata 111 from the data storing unit 101. Then, the metadata processing unit 143 sends the acquired metadata 111 to the metadata processing unit 243 in the storage device 200 at the synchronization destination.

Furthermore, if the storage device 100 is storage at the synchronization source for the regular synchronization, the metadata processing unit 143 receives, from the other storage device at the time of regular synchronization, an acquisition request for the metadata 111 on and after the metadata backup date and time stored in the storage device 200 at the synchronization destination. Subsequently, the metadata processing unit 243 acquires, from the metadata update list 105, the metadata update content on and after the metadata backup date and time stored in the storage device 100. Then, the metadata processing unit 243 acquires the metadata 111 corresponding to the acquired metadata update content from the data storing unit 101. Then, the metadata processing unit 143 sends the acquired metadata 111 to the storage device 100 at the synchronization destination.

The description has been given of a case in which asynchronous mirroring is performed on the metadata 111; however, the synchronization mirroring may also be performed on the metadata 111. In this case, if the metadata 111 in the storage device 100 is updated, the metadata 211 in the storage device 200 is also updated and, furthermore, the metadata update difference 206 is also updated; therefore, the periodical synchronization process described above is not needed.

Furthermore, the metadata processing unit 143 receives, at the time of migration, an instruction to start the migration to the storage device 200 from the connection control unit 141. Then, the metadata processing unit 143 notifies the I/O processing unit 131 of a stop instruction about the I/O process. Then, the metadata processing unit 143 notifies the synchronization agent 204 in the storage device 200 at the switching destination of the start of the meta synchronization.

Thereafter, the metadata processing unit 143 receives an acquisition request for the metadata 111 on and after the metadata backup date and time from the metadata processing unit 243 in the storage device 200. Then, the metadata processing unit 143 acquires the metadata update list 105. Thereafter, the metadata processing unit 143 sends the metadata update list 105 to the storage device 200.

The file data processing unit 144 receives, from the metadata processing unit 143 at the time of initial synchronization, an instruction to perform synchronization of the file data 112 with the storage device 200 at the synchronization destination. Then, the file data processing unit 144 starts the data synchronization. The file data processing unit 144 acquires the file data 112 from the data storing unit 101. Then, the file data processing unit 144 sends the file data 112 to the file data processing unit 244 in the storage device 200. Thereafter, the file data processing unit 144 receives a notification of the registration completion of the file data backup date and time from the file data processing unit 244. Then, the file data processing unit 144 notifies the operation management server 41 of the notification of the synchronization completion.

If the I/O process is performed, the file data processing unit 144 receives an instruction to update the file data 112 from the I/O processing unit 131. Then, the file data processing unit 144 acquires the file data backup date and time from the operation side synchronization control information 107. Then, the file data processing unit 144 determines whether the metadata update content that is added after the file data backup date and time is present in the metadata update difference 106. Consequently, the file data processing unit 144 determines whether the latest file data 112 targeted for an update is present in the data storing unit 101. Namely, if the metadata update content that is added after the file data backup date and time is present in the metadata update difference 106, the file data 112 that is in operation is updated on the date and time in the metadata update content. Consequently, in this case, the file data processing unit 144 determines that the latest file data 112 targeted for the update is not present in the data storing unit 101. In contrast, if the metadata update content that is added after the file data backup date and time is not present in the metadata update difference 106, this indicates that an update of the file data that is in operation is not performed after that. Thus, in this case, the file data processing unit 144 determines that the latest file data 112 targeted for the update is present in the data storing unit 101.

If the latest file data 112 targeted for the update is present in the data storing unit 101, the file data processing unit 144 updates the file data 112 that is targeted for the update stored in the data storing unit 101 with the update content obtained this time. In contrast, if the latest file data 112 targeted for the update is not present in the data storing unit 101, the file data processing unit 144 checks the insufficient data acquisition destination storage information in the operation side synchronization control information 107 and acquires the information on the storage device in which the latest file data 112 targeted for the update is stored. Here, a description will be given of a case in which the storage device 200 is specified as the insufficient data acquisition destination storage.

The file data processing unit 144 acquires the file data 212 from the data storing unit 201 in the storage device 200. Then, the file data processing unit 144 adds the update obtained this time to the acquired file data 212. Thereafter, the file data processing unit 144 writes the file data 212 to which the update is added to the data storing unit 101.

Furthermore, if the regular synchronization is performed with the storage device 200 as the synchronization source, the file data processing unit 144 receives, from the storage device 200, the acquisition request for the file data 112 that is associated with the metadata update content on and after the file data backup date and time of the storage device 200. Then, the file data processing unit 144 acquires the file data 112 corresponding to the specification at the acquisition request. Then, the file data processing unit 144 sends the acquired file data 112 to the storage device 100.

In the following, by referring back to FIG. 3, the storage device 200 that is the standby storage device will be described. The storage device 200 includes the synchronization agent 204, an agent 203, and the data storing unit 201.

Figure 5B:
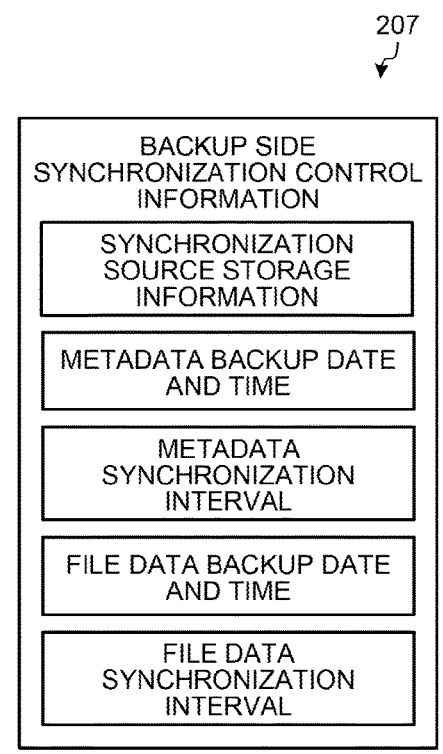
FIG. 5B is a schematic diagram illustrating backup side synchronization control information.

The backup side synchronization control information 207 and the metadata update difference 206 are stored in a synchronization information storing unit 220. FIG. 5B is a schematic diagram illustrating backup side synchronization control information. As illustrated in FIG. 5B, the backup side synchronization control information 207 includes synchronization source storage information, the metadata backup date and time, the metadata synchronization interval, the file data backup date and time, and the file data synchronization interval. The synchronization source storage information is connection information on the storage device 100 that is the synchronization source of the metadata 211 and the file data 212. The metadata backup date and time is the last synchronization date and time of the metadata 211. The metadata synchronization interval is the period in which the meta synchronization is performed. The file data synchronization interval stores therein the period in which the data synchronization is performed.

Furthermore, the synchronization information storing unit 220 stores therein a metadata update list 205 that is created when migration is performed and the synchronization information storing unit 220 is operated as the operation storage. If the storage device 200 is operated as the standby storage device, because the metadata update list 205 is not present in the synchronization information storing unit 220, the metadata update list 205 is represented by the dotted line in FIG. 3.

The synchronization agent 204 includes the connection control unit 241 and a synchronization process execution unit 242. Then, the synchronization process execution unit 242 includes the metadata processing unit 243 and the file data processing unit 244.

If the information and the synchronization policy at the synchronization destination are input to the operation management server 41 by an administrator using the management terminal 44, the connection control unit 241 receives the information and the synchronization policy at the synchronization destination from the operation management server 41. Then, the connection control unit 241 stores the information and the synchronization policy at the synchronization destination in the backup side synchronization control information 207.

Furthermore, when the connection control unit 241 performs the initial synchronization, the connection control unit 241 receives the synchronization start instruction from the operation management server 41. Then, the connection control unit 241 acquires the information on the connection destination from the backup side synchronization control information 207. Then, the connection control unit 241 performs communication with the connection control unit 141 in the storage device 100 that is the connection destination and checks the connection destination. When the connection destination is checked, the connection control unit 241 notifies the metadata processing unit 243 of the start of the initial synchronization.

Furthermore, when the migration is performed, the connection control unit 241 previously receives, from the operation management server 41, an input of the information on the switching source data center that corresponds to the switching source of the providing source of a predetermined service, the information on the synchronization destination after the switching, and the synchronization policy after the switching. The switching source data center mentioned here is the operation side data center that provides a predetermined service. Furthermore, the connection control unit 241 refers to the operation side data center management table in the operation management server 41 and checks that the current operation side data center is the data center 10. Then, the connection control unit 241 registers, in the backup side synchronization control information 207, the information on the switching source data center, information on the synchronization destination after the switching, and the synchronization policy after the switching. In the following, a description will be given of a case in which the switching source data center is the data center 10.

When the migration is performed, the connection control unit 241 receives an instruction to switch the operation data centers from the operation management server 41. Then, the connection control unit 241 acquires the information on the data center 10 as the switching source data center from the operation side synchronization control information 107. Then, the connection control unit 241 specifies the storage device 100 arranged in the data center 10 as the connection destination. Thereafter, the connection control unit 241 performs communication with the connection control unit 141 in the storage device 100 that is the connection destination and checks the connection destination. When the connection destination has been checked, the connection control unit 241 notifies the metadata processing unit 243 of the start of the migration to the storage device 100.

Furthermore, the connection control unit 241 receives a notification of the migration completion from the file data processing unit 244. Then, the connection control unit 241 disassembles and reconstructs the hard disk disassembles and reconstructs the hard disk. Namely, the manager 102 performs the setting such that the setting of the hard disk that stores therein the data for a predetermined service is initialized and synchronization is performed with the storage device specified by the backup side synchronization control information 207.

The metadata processing unit 243 receives, at the time of initial synchronization, a notification of the start of the initial synchronization from the connection control unit 241. Thereafter the metadata processing unit 243 receives the metadata 111 from the metadata processing unit 143 in the storage device 100. Then, the metadata processing unit 243 stores the received metadata 111 in the data storing unit 201 as the metadata 211. Thereafter, the metadata processing unit 243 receives a notification of the completion of the meta synchronization from the metadata processing unit 143. Then, the metadata processing unit 243 registers the date and time of the completion of the meta synchronization in the backup side synchronization control information 207 as the metadata backup date and time. Thereafter, the metadata processing unit 243 notifies the metadata processing unit 143 of the registration completion of the metadata backup date and time.

Furthermore, if the synchronization mirroring is set with respect to the metadata 211, the metadata processing unit 243 receives an input of the metadata 111 that is updated when the I/O process is executed from the metadata processing unit 143. Then, the metadata processing unit 243 writes the acquired metadata 111 to the data storing unit 201 as the metadata 211. Furthermore, the metadata processing unit 243 registers the metadata update content on the updated metadata 211 in the metadata update difference 206. Thereafter, the metadata processing unit 243 notifies the metadata processing unit 143 of the update completion of the metadata 211.

Furthermore, a description will be given of an operation of the metadata processing unit 243 when synchronization of the metadata 211 and the file data 212 is performed with the other storage device as the regular synchronization. First, a description will be given of a case of the synchronization destination of the regular synchronization. At this point, the other storage device also has the same configuration as that of the storage device 200.

The metadata processing unit 243 acquires, from the backup side synchronization control information 207, the synchronization policy and the information on the other storage device that is the storage device at the synchronization destination. Then, the metadata processing unit 243 waits until the meta synchronization period comes. If the meta synchronization period comes, the metadata processing unit 243 acquires the metadata backup date and time from the backup side synchronization control information 207. Then, the metadata processing unit 243 sends the acquisition request for the metadata 211 on and after the metadata backup date and time to the other storage device. Then, the metadata processing unit 243 acquires the metadata 211 on and after the metadata backup date and time from the other storage device.

Then, the metadata processing unit 243 updates the metadata 211 by writing the acquired metadata 211 to the data storing unit 201. Furthermore, the metadata processing unit 243 adds the metadata update content of the updated metadata 211 to the metadata update difference 206.

Furthermore, the metadata processing unit 243 registers, in the backup side synchronization control information 207 as the metadata backup date and time, the date and time on which the metadata 211 is updated at this timing. Then, the metadata processing unit 243 ends the regular synchronization of the metadata 211. The metadata processing unit 243 at the synchronization destination between the standby storage devices at the time of synchronization corresponds to an example of a "second management data acquiring unit".

Furthermore, in a case of storage at the synchronization source at the time of the regular synchronization, the metadata processing unit 243 receives, from the other storage device, an acquisition request for the metadata 211 on and after the metadata backup date and time in the other storage device at the synchronization destination. Subsequently, the metadata processing unit 243 acquires the metadata backup date and time of the own device from the backup side synchronization control information 207. Then, the metadata processing unit 243 acquires, from the data storing unit 201, the metadata 211 between the metadata backup date and time of the other storage device and the metadata backup date and time of the own device. Then, the metadata processing unit 243 sends the acquired metadata 211 to the other storage device at the synchronization destination.

Furthermore, when migration is performed, the metadata processing unit 243 receives a notification of the start of the migration to the storage device 100 from the connection control unit 241. Thereafter, the metadata processing unit 243 receives a notification of start of the meta synchronization from the metadata processing unit 143 in the storage device 100. Then, the metadata processing unit 243 acquires the metadata backup date and time from the backup side synchronization control information 207. Subsequently, the metadata processing unit 243 sends an acquisition request for the metadata 111 on and after the metadata backup date and time to the metadata processing unit 143.

Thereafter, the metadata processing unit 243 receives the metadata update list 105 from the metadata processing unit 143. Then, the metadata processing unit 243 stores the received metadata update list 105 in the synchronization information storing unit 220 and creates the metadata update list 205 that is used for the own device serving as the operation storage device. The metadata processing unit 243 acquires a difference between the metadata 111 stored in the operation storage device remaining at the time of the switching and the metadata 211 stored in the storage device 100 at the switching destination by comparing the created metadata update list 205 with the metadata update difference 206. The metadata processing unit 243 acquires the shortfall of the metadata 111 from the storage device 100 in accordance with the backup side synchronization control information 207.

Thereafter, the metadata processing unit 243 notifies the metadata processing unit 143 of a notification of creation completion of the metadata update list 205. The metadata processing unit 243 mentioned here corresponds to an example of a "first management data acquiring unit".

The file data processing unit 244 receives, at the time of initial synchronization, an input of the file data 112 from the file data processing unit 144 in the storage device 100 at the synchronization source. Then, the file data processing unit 244 stores the acquired file data 112 in the data storing unit 201 as the file data 212. Then, the file data processing unit 244 receives the completion notification of the data synchronization from the file data processing unit 144. Then, the file data processing unit 244 registers the date and time on which the completion notification of the data synchronization was received in the backup side synchronization control information 207 as the file data backup date and time. Then, the file data processing unit 244 notifies the file data processing unit 144 of the registration completion of the file data backup date and time. Thereafter, the file data processing unit 244 notifies the operation management server 41 of the synchronization completion.

Furthermore, if the regular synchronization is performed with the other storage device as the synchronization destination, the file data processing unit 244 acquires the synchronization policy and the information on the other storage device that is the storage device at the synchronization destination from the backup side synchronization control information 207. Then, the file data processing unit 244 waits until the data synchronization period comes. When the data synchronization period comes, the file data processing unit 244 acquires the file data backup date and time from the backup side synchronization control information 207. Then, the file data processing unit 244 acquires the metadata update content on and after the file data backup date and time from the metadata update difference 206. Then, the file data processing unit 244 sends an acquisition request for the file data 212 associated with the acquired metadata update content to the other storage device.

Thereafter, the file data processing unit 244 receives the file data 212 associated with the metadata update content on and after the file data backup date and time from the other storage device. Then, the file data processing unit 244 stores the received file data 212 in the data storing unit 201 and performs an update. Furthermore, the file data processing unit 244 updates the file data backup date and time of the backup side synchronization control information 207 to the date and time at that point. Then, the file data processing unit 244 determines whether an update of all of the pieces of the file data 212 associated with the metadata update content on and after the file data backup date and time. If there is the file data 212 that is not updated, the file data processing unit 244 repeats the process of updating the file data 212. If an update of all of the pieces of the file data 212 has been completed, the file data processing unit 244 ends the update process of the file data 212. The file data processing unit 244 at the synchronization destination at the time of synchronization between the standby storage devices corresponds to an example of a "second actual data acquiring unit".

Furthermore, if the regular synchronization is performed with the other storage device as the synchronization source, the file data processing unit 244 receives, from the other storage device, an acquisition request for the file data 212 associated with the metadata update content of the other storage device on and after the file data backup date and time. Then, the file data processing unit 244 acquires the file data 212 that is specified by the acquisition request. Then, the file data processing unit 244 sends the acquired file data 212 to the other storage device. The file data processing unit 244 mentioned here corresponds to an example of a "first actual data acquiring unit".

Furthermore, the agent 203 includes an I/O processing unit 231. If the storage device 200 becomes the operation storage due to migration, the I/O processing unit 231 performs the same process on a predetermined service as that performed by the I/O processing unit 131.

Figure 6:
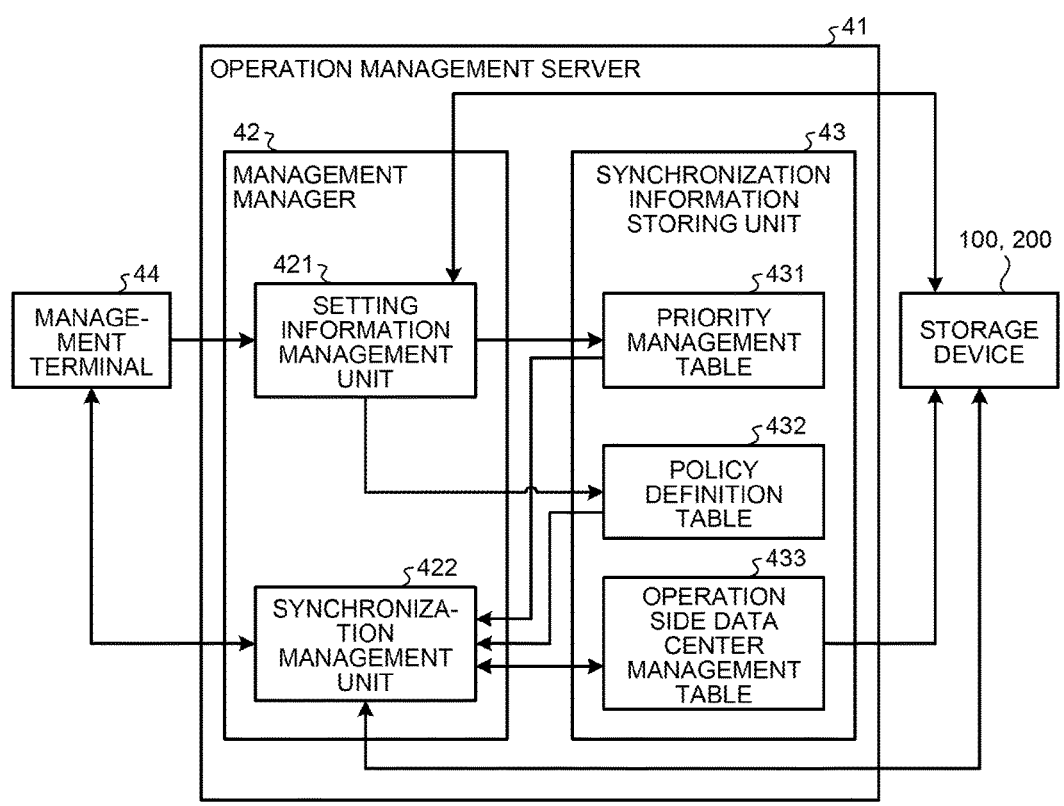
FIG. 6 is a block diagram illustrating an operation management server.

In the following, the operation management server 41 will be described with reference to FIG. 6. FIG. 6 is a block diagram illustrating an operation management server. As illustrated in FIG. 6, the management manager 42 in the operation management server 41 includes a setting information management unit 421 and a synchronization management unit 422. Furthermore, the synchronization information storing unit 43 includes a priority management table 431, a policy definition table 432, and an operation side data center management table 433.

The priority management table 431 is a table that represents the priority of each of the data centers that are the synchronization destinations for a backup. The priority management table 431 is created, for example, for each service.

The priority management table 431 has the format like that illustrated in, for example, FIG. 7. FIG. 7 is a schematic diagram illustrating an example of a priority management table. FIG. 7 illustrates the priority management table that is used when the data stored in the country A data center in the country A is backed up to the B to E country data centers in the countries B to E, respectively.

In FIG. 7, the priority of the B country data center is the highest and the priority is sequentially decreased in the order the countries C, D, and E. Here, a data center is established in each of the countries A to E and information to which the name of the country is added is used as the data center identification information.

Furthermore, in the priority management table 431, what sort of synchronization policy is used for each of the data centers is registered. For example, a policy #1 is allocated to the B country data center, a policy #2 is allocated to C and D country data centers, and a policy #3 is allocated to the E country data center. The definition of each of the policies will be described later. The priority management table 431 mentioned here corresponds to an example of a "priority storing unit".

The policy definition table 432 is a table in which the setting of the synchronization policies allocated to the respective data centers is registered. The policy definition table 432 has the format like that illustrated in, for example, FIG. 8. FIG. 8 is a schematic diagram illustrating an example of policy definition table.

In FIG. 8, three synchronization policies, i.e., the policies #1 to #3, are set. In FIG. 8, for the frequency of synchronization, the highest frequency is the perfect synchronization and the frequency is sequentially decreased in the order of high, medium, and low. Regarding the policy #1, the meta synchronization frequency is the perfect synchronization and the frequency of data synchronization is high. Furthermore, regarding the policy #2, the meta synchronization is high and the frequency of data synchronization is high. Furthermore, regarding the policy #3, the meta synchronization frequency is high and the frequency of data synchronization is medium. The frequency of synchronization is sequentially decreased in the order the policies #1, #2, and #3 and this indicates the degree of importance of backup is decreased in this order. Furthermore, in the policy definition table 432 illustrated in FIG. 8, the number of data centers that uses the subject policy is registered for each policy. In FIG. 7, the synchronization policies determined here are allocated to the respective data centers. For example, in the B country data center illustrated in FIG. 7, the meta synchronization frequency is the perfect synchronization and the frequency of data synchronization is high.

It is preferable to appropriately set, in accordance with the environment at the time of design, each of the frequencies that are represented by high, medium, and low and that are the levels indicating the frequency of synchronization. For example, if the frequency of update of the operation data is low and the cost is low, the synchronization performed every one hour is set to a high frequency and the synchronization performed every 24 hours is set to a medium frequency. Furthermore, if the frequency of update of the operation data is high and the cost is high, the synchronization performed every 24 hours is set to a high frequency and the synchronization performed every 72 hours is set to a medium frequency.

As the factor of determining a value of the frequency of synchronization, for example, the following factors are present. For one thing, there is the frequency of update of each of the metadata 111 and the file data 112. If this frequency of update is low, a difference between the metadata 111 and the file data 112 becomes low and the cost of a backup is decreased. Thus, if the frequency of update of each of the metadata 111 and the file data 112 is low, the frequency of synchronization is preferably set to high.

Furthermore, as another factor, there is an acceptable level of the backup cost. When synchronization (backup) is performed, because data on the synchronization source, if synchronization of the data in the data center 10 that is the operation side data center is performed, a load is applied to the operation performance of the data center 10. Thus, it is preferable to set the frequency of synchronization to high as long as the environment can accept a certain amount of degradation of the operation performance.

Furthermore, as another factor, there is the target switching time at the time of migration. In order to reduce the switching time at the time of migration, it is preferable to set the frequency of synchronization to high and set a data difference to small. If five minutes is targeted for the switching, it is preferable to finish the perfect synchronization of the metadata 211 and the file data 212 that are backup data stored in the standby data center 20 within 5 minutes. With this example, the frequency of synchronization is determined in the range of an amount of data difference in which the perfect synchronization can be completed within 5 minutes.

Furthermore, as another factor, there is the performance of hardware. If the performance of hardware, such as the storage devices 100 and 200 or the like, is high, the time taken for synchronization becomes short and thus the load is reduced. Consequently, if the performance of hardware is high, the frequency of synchronization can be set to high.

Furthermore, as another factor, there is the performance of a network, such as a network between the storage devices 100 and 200 or the like, that sends and receives data to be synchronized. The load applied due to synchronization is determined on the basis of the width of band or the speed of a response of the network in which data to be synchronized is sent and received. For example, if the performance of the network is high, the frequency of synchronization can be set to high.

A description will be continued here by referring back to FIG. 6. The operation side data center management table 433 indicates, from among the data centers, the operation side data center that provides a predetermined service. For example, the operation side data center management table 433 manages the history of the past five generations. The operation side data center management table 433 is used when the synchronization agent 204 at the migration destination checks the migration source at the time of migration.

The setting information management unit 421 receives, before the initial synchronization from the management terminal 44, an input of the definition of the policy that is used for synchronization. Then, the setting information management unit 421 registers the input definition of the policy in the policy definition table 432. Furthermore, the setting information management unit 421 registers the input priority of each of the databases in the priority management table 431.

Furthermore, the setting information management unit 421 receives, from the management terminal 44, an input of information on the connection destination for performing synchronization of data on each service, the priority of each of the connection destinations, and the policy that is allocated to each of the connection destinations. Then, the setting information management unit 421 registers, for each service, the connection destination at the time of synchronization, the priority of the connection destination, and the allocated policy and then creates the priority management table 431. At this point, the synchronization source is not always the operation storage device. Namely, a backup may also be performed to the other storage device by using the storage device that performs a backup from the operation storage, for example, the storage device 200, as the synchronization source. Accordingly, the priority management table 431 is created for each synchronization source in each service. In the following, a description will be given of a case in which the storage device 100 is used as synchronization source and the storage device 200 is used as the synchronization destination.

Furthermore, the setting information management unit 421 sends, to the storage device 100 that becomes the synchronization source, information on the connection destination for performing synchronization of data on each service, the priority of each of the connection destinations, and the policy that is allocated to each of the connection destinations. Furthermore, the setting information management unit 421 notifies the storage device 200 that becomes the synchronization destination of the information on the synchronization source and the synchronization policy of the storage device 200.

Furthermore, the setting information management unit 421 receives, at the time of migration, an input of information on the service targeted for the switching and the information on the switching destination. Furthermore, the setting information management unit 421 receives, from the management terminal 44, an input of the information on the connection destination for performing synchronization after the migration, the priority of each of the connection destinations, and the policy that is allocated to each of the connection destinations. Then, the setting information management unit 421 stores the information on the switching destination of the migration in the operation side data center management table 433.

Furthermore, the setting information management unit 421 sends, to the storage device 200 that becomes the synchronization source after the migration, information on the connection destination for performing synchronization of data on each service after the migration, the priority of each of the connection destinations, and the policy allocated to each of the connection destinations. Furthermore, the setting information management unit 421 notifies the storage device 100, which becomes the synchronization destination after the migration, of the information on the synchronization source and the synchronization policy of the storage device 100. Thereafter, the setting information management unit 421 notifies the synchronization management unit 422 that distribution of the synchronization policy has been completed.

The synchronization management unit 422 receives, at the time of initial synchronization, an input of a start instruction of initial synchronization from the management terminal 44. Then, in response to the start instruction of the initial synchronization, the synchronization management unit 422 acquires the information on the data center at the synchronization destination from the priority management table 431.

Then, the synchronization management unit 422 gives an instruction to start synchronization to the storage at the synchronization source and the storage at the synchronization destination. At this point, the synchronization source is the storage device 100 and the synchronization destination is the storage device 200. Thereafter, the synchronization management unit 422 acquires a synchronization completion notification from the storage device 200 that is the synchronization destination with respect to the storage device 100 in which the synchronization process has been ended.

Then, the synchronization management unit 422 acquires, from the priority management table 431, information on the synchronization destination data center on the synchronization that is related to the data on a predetermined service and of which synchronization source is different. For example, an example of this case includes a case in which the storage device 200 that performed synchronization with the storage device 100 that provides a predetermined service is used as the synchronization source and synchronization is performed with the other storage device. Thereafter, the synchronization management unit 422 receives a synchronization completion notification from the storage devices at the synchronization source and the synchronization destination. Then, the synchronization management unit 422 sends a synchronization completion notification to the management terminal 44.

Furthermore, the synchronization management unit 422 receives, from the setting information management unit 421 at the time of migration, a notification indicating that distribution of the synchronization policy has been completed. Then, the synchronization management unit 422 instructs the storage device 100 that is the switching source and the storage device 200 that is the switching destination to start migration. Thereafter, the synchronization management unit 422 receives the switching completion notification from the storage device 200 that is the switching destination of the migration. The synchronization management unit 422 mentioned here corresponds to an example of a "switching unit".

Figure 9:
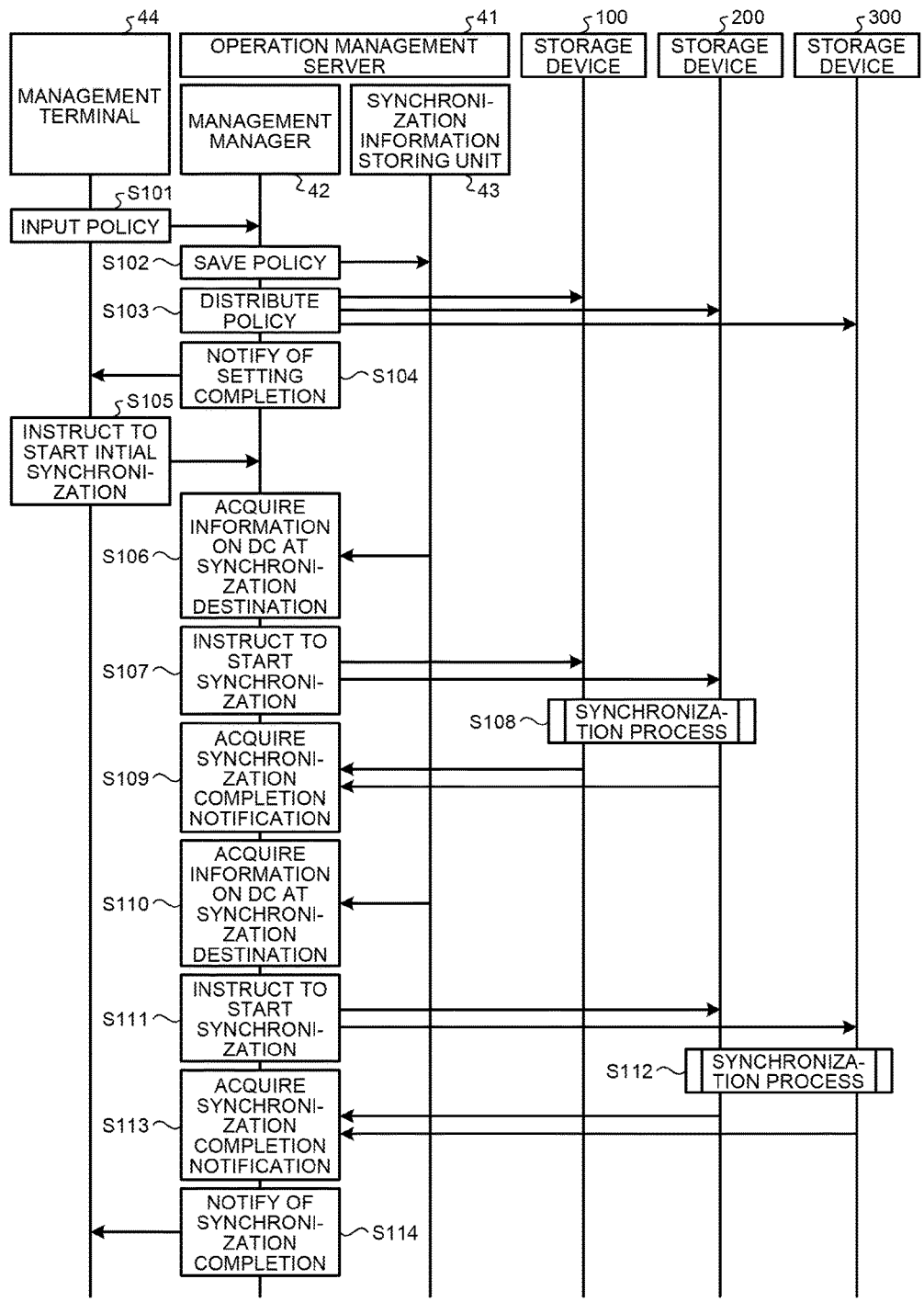
FIG. 9 is a sequence diagram illustrating a process performed by the operation management server at the time of initial synchronization.

In the following, the process performed by the operation management server 41 at the time of initial synchronization will be described with reference to FIG. 9. FIG. 9 is a sequence diagram illustrating a process performed by the operation management server at the time of initial synchronization.

The management manager 42 receives, before the initial synchronization is started, an input of the definition of the policy that is used for the synchronization from the management terminal 44 (Step S101). In the definition of this policy, the priority of each of the databases that becomes the connection destinations is included. Then, the management manager 42 registers and stores the input definition of the policy in the policy definition table 432 (Step S102). Furthermore, the management manager 42 also creates the priority management table 431.

Furthermore, the management manager 42 distributes, to the storage device 100 that becomes the synchronization source, the information on the connection destination for performing synchronization of data on each service, the priority of each of the connection destinations, and the policy that is allocated to each of the connection destinations. Furthermore, the management manager 42 distributes the information on the synchronization source and the synchronization policy to the storage devices 200 and 300 that become the synchronization destination (Step S103). Thereafter, the management manager 42 sends the notification of the setting completion to the management terminal 44 (Step S104).

Thereafter, the management manager 42 receives a start instruction of the initial synchronization from the management terminal 44 (Step S105). Then, the management manager 42 acquires the information on the synchronization destination data center (DC) from the priority management table 431 in the synchronization information storing unit 43 (Step S106). At this point, a description will be given with the assumption that the storage device 200 is the synchronization destination of the storage device 100 and the storage device 300 is the synchronization destination of the storage device 200. In this case, because the storage device 100 has the original data for providing a service, synchronization with the storage device 100 and the storage device 200 is performed first and then synchronization with the storage device 200 and the storage device 300 is performed. Accordingly, first, the management manager 42 acquires information on the data center 20 as the information on the synchronization destination of the storage device 100. Then, the management manager 42 sends a synchronization start instruction to the storage devices 100 and 200 (Step S107).

Thereafter, a synchronization process is performed between the storage device 100 and the storage device 200 (Step S108). Then, the management manager 42 acquires a notification of the synchronization completion from the storage devices 100 and 200 (Step S109).

Furthermore, the management manager 42 acquires the information on the data center that is the next synchronization destination (Step S110). Namely, the management manager 42 acquires, as the information on the storage device 200 at the synchronization destination, the information on the data center in which the storage device 300 is arranged. Then, the management manager 42 sends the synchronization start instruction to the storage devices 200 and 300 (Step S111).

Thereafter, the synchronization process is performed between the storage device 200 and the storage device 300 (Step S112). Then, the management manager 42 acquires a notification of the synchronization completion from the storage devices 200 and 300 (Step S113). Thereafter, the management manager 42 sends the notification of the synchronization completion to the management terminal 44 (Step S114).

Figure 10:
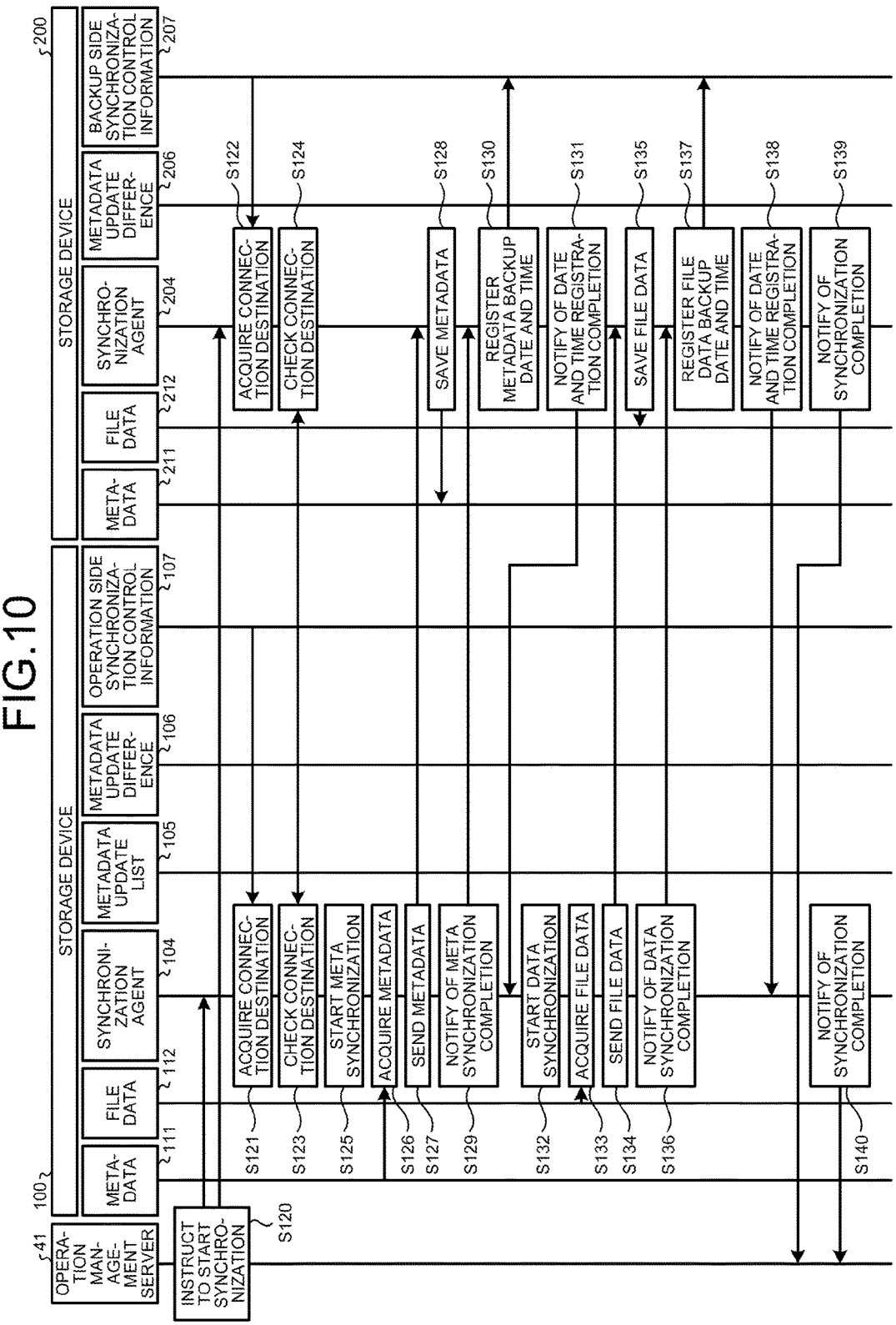
FIG. 10 is a sequence diagram illustrating a process performed by an operation storage device and a standby storage device at the time of the initial synchronization.

In the following, the flow of a process performed by the storage device 100 that is the operation storage device and the storage device 200 that is the standby storage device at the time of initial synchronization will be described with reference to FIG. 10. FIG. 10 is a sequence diagram illustrating a process performed by an operation storage device and a standby storage device at the time of the initial synchronization. The process represented by the sequence diagram illustrated in FIG. 10 is an example of the process at Step S108 illustrated in FIG. 9.

The synchronization agents 104 and 204 acquire an instruction to start synchronization from the operation management server 41 (Step S120). Then, the synchronization agent 104 acquires the information on the connection destination from the operation side synchronization control information 107 (Step S121). Furthermore, the synchronization agent 204 acquires the information on the connection destination from the backup side synchronization control information 207 (Step S122). Then, the synchronization agent 104 checks that the storage device 200 is the connection destination (Step S123). Similarly, the synchronization agent 204 checks that the storage device 100 is the connection destination (Step S124).

Then, the synchronization agent 104 starts the meta synchronization (Step S125). First, the synchronization agent 104 acquires the metadata 111 from the data storing unit 101 (Step S126). Then, the synchronization agent 104 sends the acquired metadata 111 to the synchronization agent 204 (Step S127). The synchronization agent 204 stores the metadata 111 received from the synchronization agent 104 in the data storing unit 201 as the metadata 211 (Step S128).

When the synchronization agent 104 sends all of the pieces of the metadata 111 that are used to operate a predetermined service, the synchronization agent 104 sends a notification of the completion of the meta synchronization to the synchronization agent 204 (Step S129). In response to the notification of the completion of the meta synchronization, the synchronization agent 204 registers the metadata backup date and time in the backup side synchronization control information 207 (Step S130). Thereafter, the synchronization agent 204 sends a notification of the date and time registration completion to the synchronization agent 104 (Step S131).

When the synchronization agent 104 receives the notification of the date and time registration completion, the synchronization agent 104 starts the data synchronization (Step S132). First, the synchronization agent 104 acquires the file data 112 from the data storing unit 101 (Step S133). Then, the synchronization agent 104 sends the file data 112 to the synchronization agent 204 (Step S134). The synchronization agent 204 stores the file data 112 received from the synchronization agent 104 in the data storing unit 201 as the file data 212 (Step S135).

When the synchronization agent 104 sends all of the pieces of the file data 112 that are used to operate a predetermined service, the synchronization agent 104 sends a notification of the completion of the data synchronization to the synchronization agent 204 (Step S136). In response to the notification of the completion of data synchronization, the synchronization agent 204 registers the file data backup date and time in the backup side synchronization control information 207 (Step S137). Thereafter, the synchronization agent 204 sends a notification of the date and time registration completion to the synchronization agent 104 (Step S138).

Thereafter, the synchronization agent 204 sends a notification for synchronization management to the operation management server 41 (Step S139). Furthermore, the synchronization agent 104 also sends a notification for synchronization management to the operation management server 41 (Step S140).

Furthermore, for the synchronization performed between the storage device 200 and the storage device 300 indicated at Step S113 illustrated in FIG. 9, the synchronization is performed by the same process as that performed at the time of initial synchronization described above except that only the synchronization source and the synchronization destination are changed; therefore, the description thereof will be omitted.

Figure 11A:
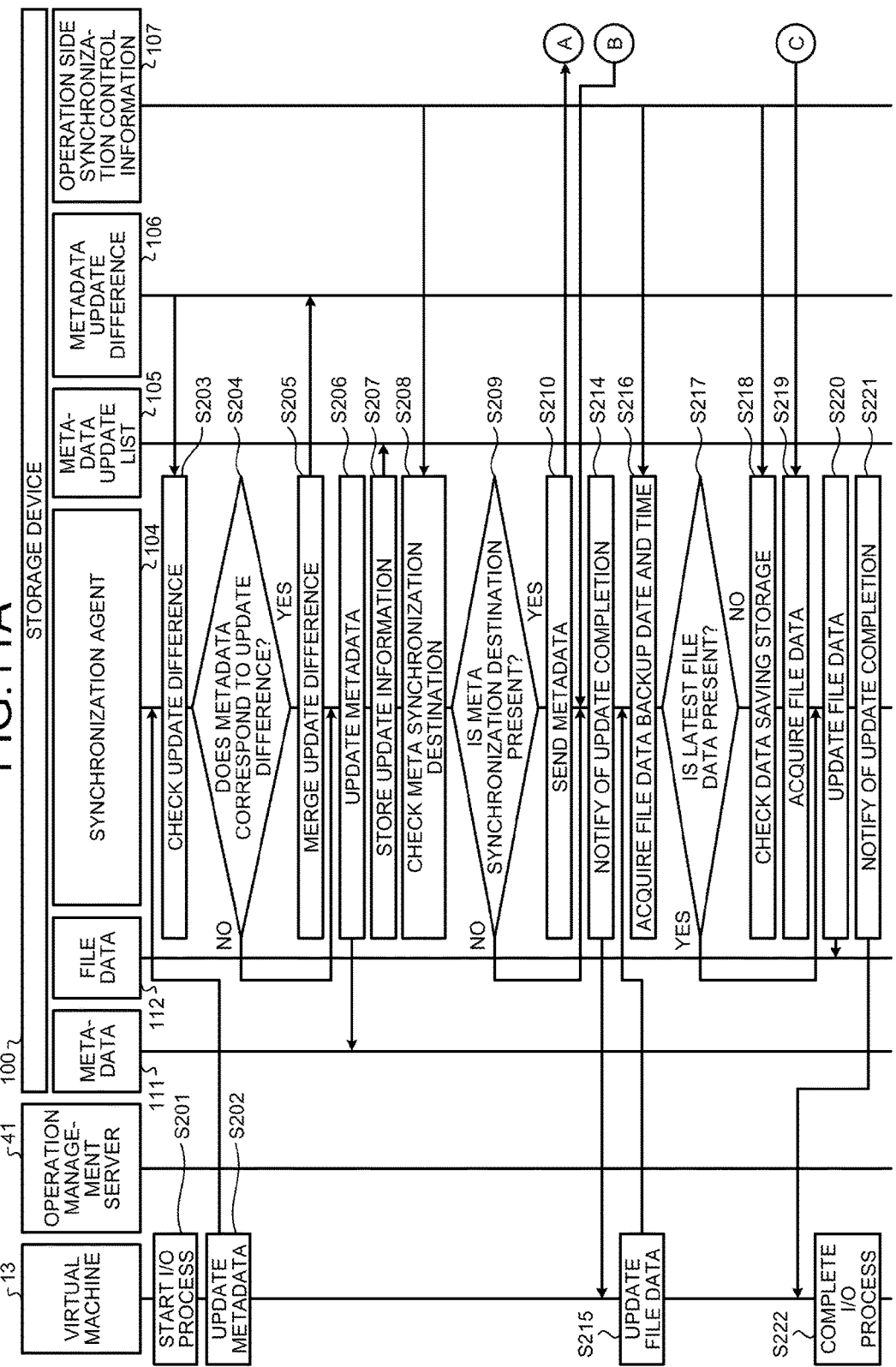
FIG. 11A is a sequence diagram illustrating a process performed by the operation storage device and the standby storage device when an I/O process occurs.
Figure 11B:
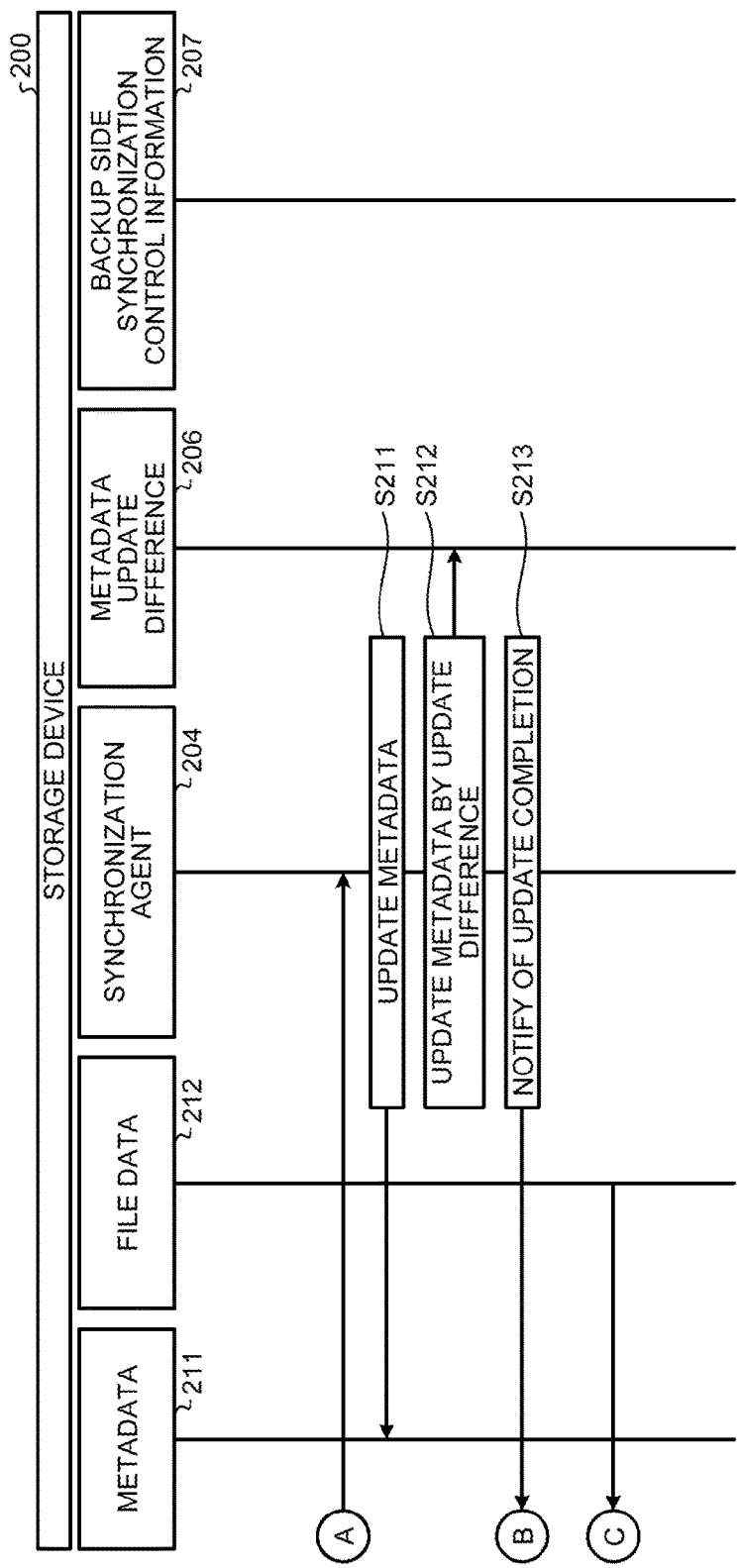
FIG. 11B is a sequence diagram illustrating a process performed by the operation storage device and the standby storage device when an I/O process occurs.

In the following, the flow of the process performed when an I/O process occurs by the storage device 100 that is the operation storage device and the storage device 200 that is the standby storage device will be described with reference to FIGS. 11A and 11B. FIGS. 11A and 11B are a sequence diagram illustrating a process performed by the operation storage device and the standby storage device when an I/O process occurs.

Due to an input performed by a customer using the customer terminal 31, the I/O process is started in the virtual machine 13 that is a business-use server (Step S201). The virtual machine 13 instructs the synchronization agent 104 to update the metadata 111 (Step S202). In response to the instruction of the update, the synchronization agent 104 checks an update difference related to the file data 112 that has not been updated from among the pieces of metadata update content stored in the metadata update difference 106 (Step S203).

The synchronization agent 104 determines whether the metadata 111 that is instructed to be updated is associated with the update difference (Step S204). If the metadata 111 is not associated with the update difference (No at Step S204), the synchronization agent 104 proceeds to Step S206. In contrast, if the metadata 111 is associated with the update difference (Yes at Step S204), the synchronization agent 104 registers the update content of the metadata 111 instructed this time in the metadata update difference 106 and merges the update difference (Step S205). Then, the synchronization agent 104 updates the metadata 111 with the content that is instructed this time (Step S206). Furthermore, the synchronization agent 104 stores the update information on the metadata 111 obtained this time in the metadata update list 105 (Step S207).

Subsequently, the synchronization agent 104 checks the meta synchronization destination that is the synchronization destination of the meta synchronization on the basis of the operation side synchronization control information 107 (Step S208). Then, if the meta synchronization destination is not present (No at Step S209), the synchronization agent 104 proceeds to Step S214.

In contrast, if the meta synchronization destination is present (Yes at Step S209), the synchronization agent 104 sends the metadata 111 to the synchronization agent 204 (Step S210). Here, a description will be given of a case in which synchronization mirroring is performed on the metadata 111. The synchronization agent 204 writes the received metadata 111 to the data storing unit 201 as the metadata 211 and performs an update (Step S211). Then, the synchronization agent 204 updates the metadata update difference 206 to the content that is updated this time (Step S212). Thereafter, the synchronization agent 204 sends a notification of the update completion to the synchronization agent 104 (Step S213).

The synchronization agent 104 sends the notification of the update completion to the virtual machine 13 (Step S214). Then, the virtual machine 13 instructs the synchronization agent 104 to update the file data 112 (Step S215). In response to the instruction to update the file data 112, the synchronization agent 104 acquires the file data backup date and time from the operation side synchronization control information 107 (Step S216). Then, the synchronization agent 104 determines whether the update holds the latest data of the file data 112 that is instructed to be updated (Step S217). For example, if migration is performed and the storage device 100 is just started to be operated as the operation storage device, there may be a case in which the latest file data 112 is not present in the storage device 100. In this case, the latest file data 112 is stored in the storage device at the synchronization destination before the migration.

If the file data 112 is present (Yes at Step S217), the synchronization agent 104 proceeds to Step S220. In contrast, if the latest file data 112 is not present (No at Step S217), the synchronization agent 104 checks, from the operation side synchronization control information 107, a data saving storage that stores therein the data that is associated with the latest file data 112 (Step S218). Here, a description will be given of a case in which the data saving storage is the storage device 200. The synchronization agent 104 acquires the file data 212 that is stored in the data storing unit 201 in the storage device 200 and that is associated with the file data 112 that is instructed to be updated (Step S219).

Then, the synchronization agent 104 updates the file data 112 (Step S220). Thereafter, the synchronization agent 104 sends a notification of the update completion to the virtual machine 13 (Step S221). In response to the notification of the update completion, the virtual machine 13 completes the I/O process (Step S222).

In the following, the flow of the process performed by the storage device 100 that is the operation storage device and the storage device 200 that is the standby storage device at the time of regular synchronization will be described with reference to FIGS. 12A and 12B. FIGS. 12A and 12B are a sequence diagram illustrating a process performed by the operation storage device and the standby storage device at the time of regular synchronization. Here, a description will be given of a case in which asynchronous mirroring is performed on the metadata 111.

The storage devices 100 and 200 periodically return from the sleep state (Step S301). Then, the synchronization agent 204 acquires the synchronization policy from the backup side synchronization control information 207 (Step S302). Then, the synchronization agent 204 determines whether the meta synchronization period comes (Step S303). If the meta synchronization period has not come (No at Step S303), the synchronization agent 204 proceeds to Step S312.

In contrast, if the meta synchronization period comes (Yes at Step S303), the synchronization agent 204 acquires the metadata backup date and time from the backup side synchronization control information 207 (Step S304). Then, the synchronization agent 204 sends an acquisition request for the metadata 111 on and after the metadata backup date and time to the synchronization agent 104 (Step S305). The synchronization agent 104 acquires the information on the metadata 111 at the synchronization source that is updated on and after the data backup date and time from the metadata update list 105 (Step S306). Then, the synchronization agent 104 acquires, by using the acquired information, the metadata 111 at the synchronization source that is update on and after the data backup date and time from the data storing unit 101 (Step S307). Then, the synchronization agent 104 sends the acquired metadata 111 from the synchronization agent 204 (Step S308).

The synchronization agent 204 writes the metadata 111 received from the synchronization agent 104 to the data storing unit 201 and updates the metadata 211 (Step S309). Furthermore, the synchronization agent 204 adds the update content of the metadata 211 this time to the metadata update difference 206 (Step S310). Then, the synchronization agent 204 updates the metadata backup date and time in the backup side synchronization control information 207 (Step S311).

Then, the synchronization agent 204 determines whether the data synchronization period comes (Step S312). If the data synchronization period has not come (No at Step S312), the storage devices 100 and 200 shift to the sleep state and the process returns to Step S301.

In contrast, if the data synchronization period comes (Yes at Step S312), the synchronization agent 204 acquires the file data backup date and time from the backup side synchronization control information 207 (Step S313). Then, the synchronization agent 204 acquires the information on the metadata 211 that is updated on and after the file data backup date and time from the metadata update difference 206 (Step S314). Then, the synchronization agent 204 sends an acquisition request for the file data 112 associated with the metadata 211 that is updated on and after the file data backup date and time to the synchronization agent 104 (Step S315). The synchronization agent 104 acquires the file data 112 associated with the metadata 211 that is updated on and after the file data backup date and time from the data storing unit 101 (Step S316). Then, the synchronization agent 104 sends the acquired file data 112 to the synchronization agent 204 (Step S317).

The synchronization agent 204 writes the file data 112 received from the synchronization agent 104 to the data storing unit 201 and updates the file data 212 (Step S318). Furthermore, the synchronization agent 204 updates the file data backup date and time in the backup side synchronization control information 207 (Step S319). Then, the synchronization agent 204 determines whether synchronization has been performed on all of the pieces of the file data 212 (Step S320). If the file data 212 that has not been synchronized is present (No at Step S320), the synchronization agent 204 returns to Step S313. In contrast, if synchronization has been performed on all of the pieces of the file data 212 (Yes at Step S320), the storage devices 100 and 200 shift to the sleep state and the process returns to Step S301.

At this point, if synchronization mirroring is performed on the metadata 111, the processes from Steps S303 to S311 are skipped and the processes from Steps S312 to S320 are performed.

As described here, the frequency of synchronization of the metadata when the storage device 100 is used as the synchronization source and the storage device 200 is used as the synchronization destination corresponds to an example of a "first frequency" and the frequency of synchronization of the file data corresponds to an example of a "second frequency".

Figure 13A:
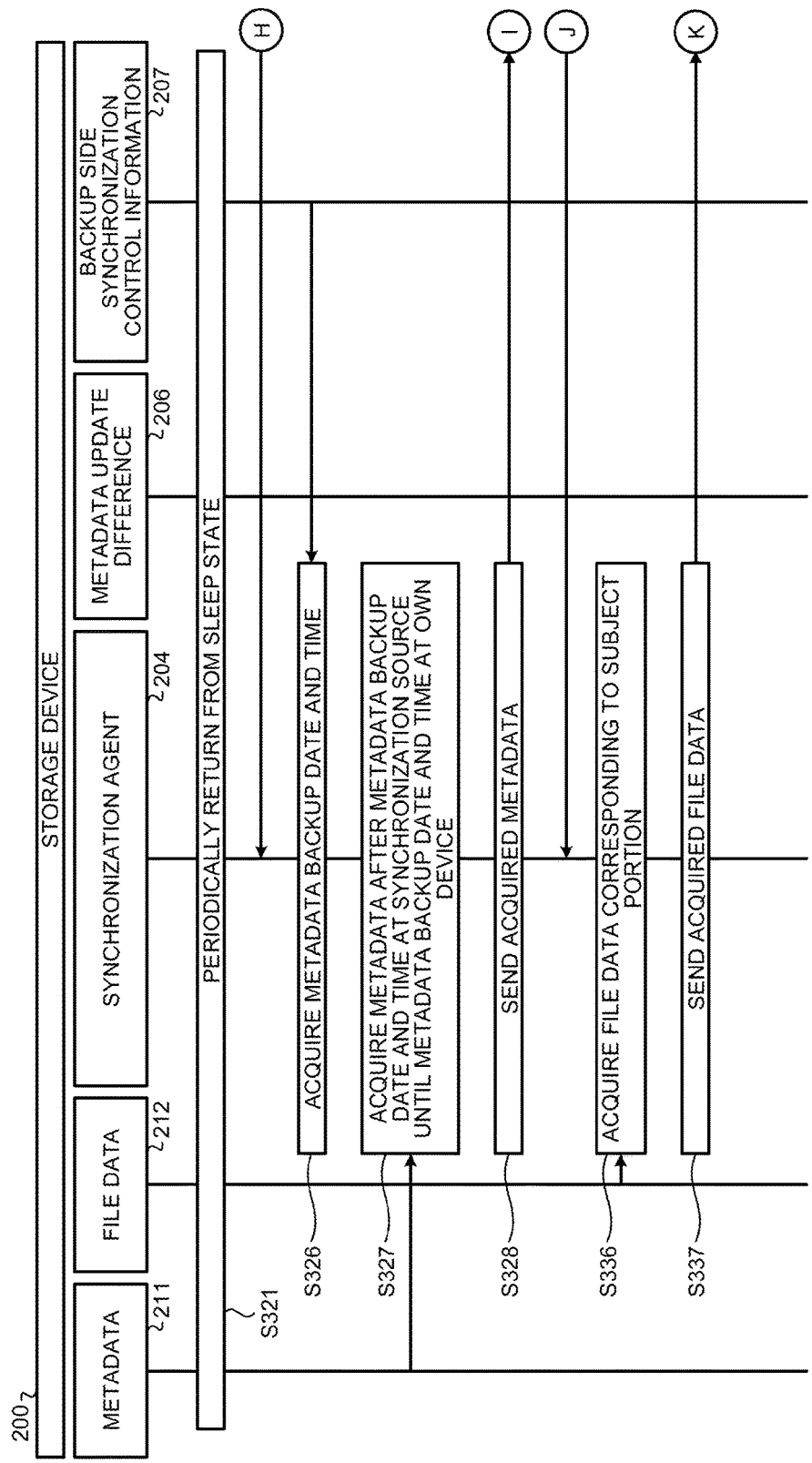
FIG. 13A is a sequence diagram illustrating a process performed by the standby storage devices at the time of regular synchronization.

In the following, the flow of a process performed by the storage devices 200 and 300 that are the standby storage device at the time of regular synchronization will be described with reference to FIGS. 13A and 13B. FIGS. 13A and 13B are a sequence diagram illustrating a process performed by the standby storage devices at the time of regular synchronization. Here, a description will be given of a case in which the asynchronous mirroring is performed on the metadata 211. Furthermore, here, a description will be given of a case in which the storage device 300 that is the standby storage device has the same configuration as that of the storage device 200. In this case, the data storing unit 201 in the storage device 200 corresponds to an example of a "specific second storing unit". Furthermore, the data storing unit 201 in the storage device 300 corresponds to an example of the "other second storing unit".

The storage devices 200 and 300 periodically return from the sleep state (Step S321). Then, the synchronization agent 204 in the storage device 300 acquires the synchronization policy from the backup side synchronization control information 207 in the storage device 300 (Step S322). Then, the synchronization agent 204 in the storage device 300 determines whether the meta synchronization period comes (Step S323). If the meta synchronization period has not come (No at Step S323), the synchronization agent 204 in the storage device 300 proceeds to Step S332.

In contrast, if the meta synchronization period comes (Yes at Step S323), the synchronization agent 204 in the storage device 300 acquires the metadata backup date and time from the backup side synchronization control information 207 in the storage device 300 (Step S324). Then, the synchronization agent 204 in the storage device 300 sends an acquisition request for the metadata 211 on and after the metadata backup date and time to the synchronization agent 204 in the storage device 200 (Step S325). The synchronization agent 204 in the storage device 200 acquires the metadata backup date and time from the backup side synchronization control information 207 in the storage device 200 (Step S326). Then, the synchronization agent 204 in the storage device 200 acquires, from the data storing unit 201 by using the acquired information, the metadata 211 on and after the data backup date and time at the synchronization source until the backup date and time of the metadata in the own device (Step S327). Then, the synchronization agent 204 in the storage device 200 sends the acquired metadata 211 to the synchronization agent 204 in the storage device 300 (Step S328).

The synchronization agent 204 in the storage device 300 writes the received metadata 211 to the data storing unit 201 in the storage device 300 and updates the metadata 211 (Step S329). Furthermore, the synchronization agent 204 in the storage device 300 adds the update content of the metadata 211 obtained this time to the metadata update difference 206 in the storage device 300 (Step S330). Then, the synchronization agent 204 in the storage device 300 updates the metadata backup date and time of the storage device 300 in the backup side synchronization control information 207 (Step S331).

Then, the synchronization agent 204 in the storage device 300 determines whether the data synchronization period comes (Step S332). If the data synchronization period has not come (No at Step S332), the storage devices 200 and 300 shift to the sleep state and the process returns to Step S321.

In contrast, if the data synchronization period comes (Yes at Step S332), the synchronization agent 204 in the storage device 300 acquires the file data backup date and time from the backup side synchronization control information 207 in the storage device 300 (Step S333). Then, the synchronization agent 204 in the storage device 300 acquires the information on the metadata 211 updated on and after the file data backup date and time from the metadata update difference 206 in the storage device 300 (Step S334). Then, the synchronization agent 204 in the storage device 300 sends an acquisition request for the file data 212 that is associated with the metadata 211 updated on and after the file data backup date and time to the synchronization agent 204 in the storage device 200 (Step S335). The synchronization agent 204 in the storage device 200 acquires the file data 212 that is associated with the metadata 211 that is updated on and after the file data backup date and time from the data storing unit 201 in the storage device 200 (Step S336). Then, the synchronization agent 204 in the storage device 200 sends the acquired file data 212 to the synchronization agent 204 in the storage device 300 (Step S337).

The synchronization agent 204 in the storage device 300 writes the received file data 212 to the data storing unit 201 in the storage device 300 and updates the file data 212 (Step S338). Furthermore, the synchronization agent 204 in the storage device 300 updates the file data backup date and time in the backup side synchronization control information 207 in the storage device 300 (Step S339). Then, the synchronization agent 204 in the storage device 300 determines whether the synchronization has been ended on all of the pieces of the file data 212 (Step S340). If the file data 212 that has not been synchronized is present (No at Step S340), the synchronization agent 204 in the storage device 300 returns to Step S333. In contrast, if the synchronization of all of the pieces of the file data 212 has been completed (Yes at Step S340), the storage devices 200 and 300 shift to the sleep state and the process returns to Step S321.

Here, if synchronization mirroring is performed on the metadata 111, the processes from Steps S323 to S331 are skipped and the processes from Steps S332 to S340 are performed.

For example, as described here, the frequency of synchronization of the metadata when the storage device 200 that is the standby storage device is used as the synchronization source and the storage device 300 that is the other standby storage device is used as the synchronization destination corresponds to an example of a "third frequency". Furthermore, the frequency of synchronization of the file data corresponds to an example of a "fourth frequency".

Figure 14:
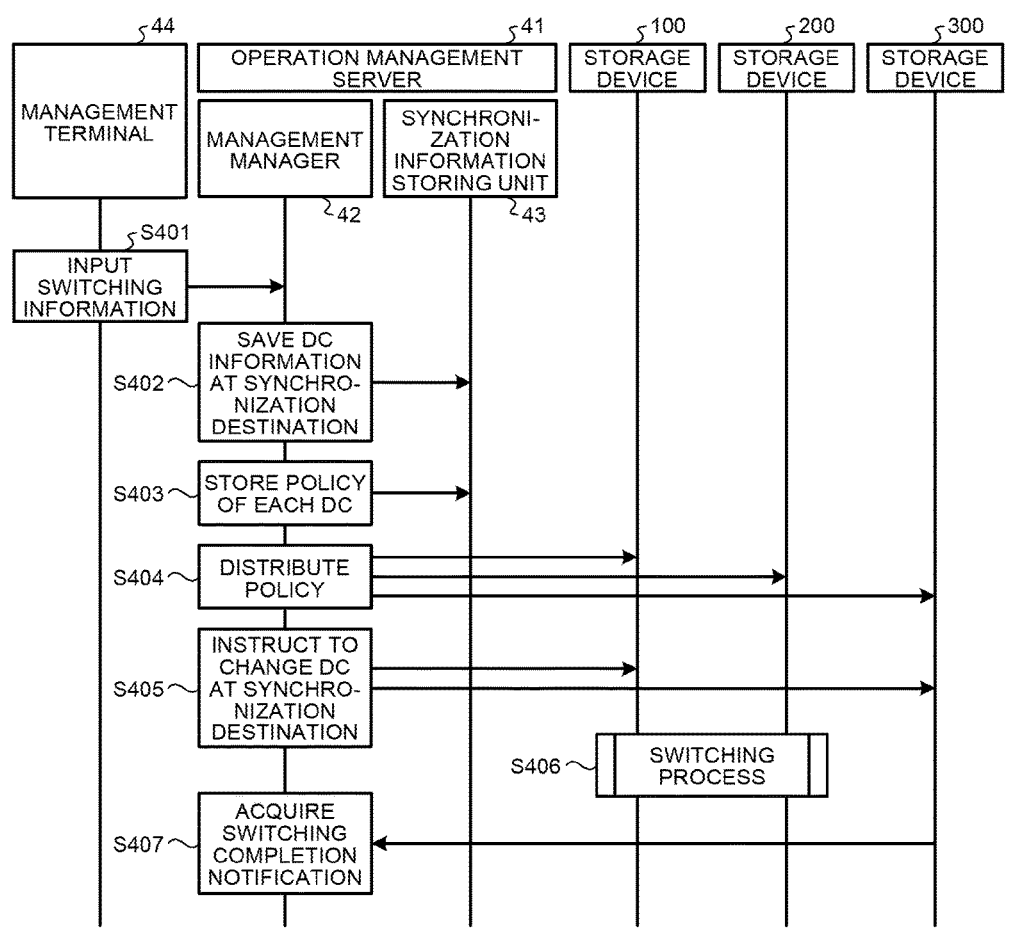
FIG. 14 is a sequence diagram illustrating a process performed by the operation management server when migration is performed.

In the following, the flow of a process performed by the operation management server 41 when the migration is performed will be described with reference to FIG. 14. FIG. 14 is a sequence diagram illustrating a process performed by the operation management server when migration is performed. Here, a description will be given of a case in which the operation storage device is switched from the storage device 100 to the storage device 200.

The management manager 42 receives an input of switching information that includes therein the information on the data centers at the switching source and the switching destination, the synchronization destination after the switching is performed, and the synchronization policy from the management terminal 44 (Step S401). Then, the management manager 42 stores the information on the data centers at the synchronization destination of each of the storage devices 100 and 300 after the switching is performed in the synchronization information storing unit 43 (Step S402). Furthermore, the management manager 42 stores, in the synchronization information storing unit 43, the synchronization policy of each of the data centers in which the storage devices 100 and 300 are arranged (Step S403).

Then, the management manager 42 distributes the policy of each of the synchronization destinations including the synchronization destination and the priority of each of the synchronization destinations to the storage devices 100 to 300 (Step S404). Then, the management manager 42 sends an instruction to change the data center at the synchronization destination to the storage devices 100 and 300 (Step S405).

The storage devices 100 and 200 perform a switching process on the operation storage device at the time of migration (Step S406). Thereafter, the management manager 42 acquires a notification of the switching completion from the storage device 200 and ends the migration process (Step S407).

Figure 15B:
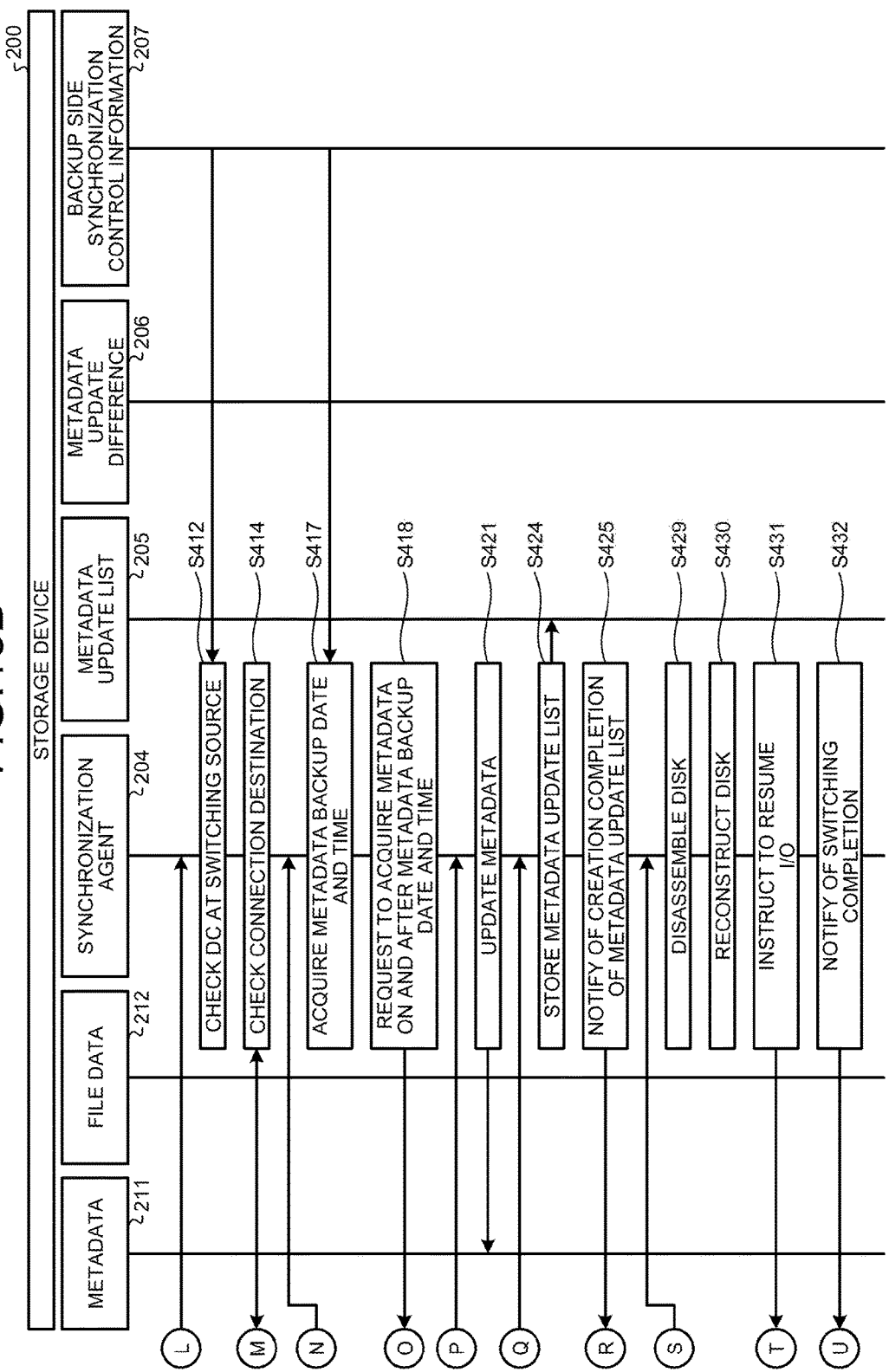
FIG. 15B is a sequence diagram illustrating a process performed by the operation storage device and the standby storage device when migration is performed.

In the following, the flow of a process performed by the storage device 100 that is the operation storage device and the storage device 200 that is the standby storage device at the time of migration will be described with reference to FIGS. 15A and 15B. FIGS. 15A and 15B are a sequence diagram illustrating a process performed by the operation storage device and the standby storage device when migration is performed. Here, a description will be given of a case in which a predetermined service providing source is switched from the storage device 100 to the storage device 200. The process illustrated in FIGS. 15A and 15B corresponds to an example of a process performed at Step S406 illustrated in FIG. 14.

The synchronization agents 104 and 204 receives, from the operation management server 41, an instruction to switch the data center that provides a predetermined service from the data center 10 to the data center 20 (Step S410). The synchronization agent 104 checks the data center at the switching destination by using the operation side synchronization control information 107 (Step S411). The synchronization agent 204 checks the data center at the switching source by using the backup side synchronization control information 207 (Step S412). Then, the synchronization agent 104 checks the storage device 200 as the connection destination (Step S413). Furthermore, the synchronization agent 204 checks the storage device 100 as the connection destination (Step S414).

Then, the synchronization agent 104 sends an I/O stop instruction to the virtual machine 13 that is the business server (Step S415). In response to this, the virtual machine 13 stops the I/O process. Then, the synchronization agent 104 notifies the synchronization agent 204 of the start of the meta synchronization (Step S416).

In response to the notification of the start of the meta synchronization, the synchronization agent 204 acquires the metadata backup date and time from the backup side synchronization control information 207 (Step S417). Then, the synchronization agent 204 sends an acquisition request for the metadata 111 on and after the metadata backup date and time to the synchronization agent 104 (Step S418).

In response to the acquisition request for the metadata 111, the synchronization agent 104 acquires the metadata 111 in the storage device 200 on and after the metadata backup date and time from the data storing unit 101 (Step S419). Then, the synchronization agent 104 sends the acquired metadata 111 in the storage device 200 on and after the metadata backup date and time to the synchronization agent 204 (Step S420). The synchronization agent 204 stores the received metadata 111 in the data storing unit 201 and updates the metadata 211 (Step S421).

Furthermore, the synchronization agent 104 acquires the metadata update list 105 (Step S422). Then, the synchronization agent 104 sends the metadata update list 105 to the synchronization agent 204 (Step S423). The synchronization agent 204 stores the metadata update list 105 as the metadata update list 205 in the synchronization information storing unit 220 (Step S424). Here, if the metadata 211 that has not been updated is present at the time of the switching, the synchronization agent 204 compares the metadata update list 205 with the metadata update difference 206 and specifies the metadata 211 that is not updated at the time of the switching. Then, the synchronization agent 204 acquires the metadata 211 that has not been updated at the time of the switching from the synchronization source specified in the backup side synchronization control information 207. Thereafter, the synchronization agent 204 notifies the synchronization agent 104 of the metadata update completion (Step S425).

The synchronization agent 104 disassembles the disk in which data on a predetermined service was stored, i.e., releases the setting of the synchronization or the like (Step S426). Furthermore, the synchronization agent 104 reconstructs the disassembled disk such that the disk does not perform synchronization with the storage device 200 as the operation storage device at the time of I/O (Step S427). Thereafter, the synchronization agent 104 notifies the synchronization agent 204 of the completion of the reconstruction of the disk (Step S428).

The synchronization agent 204 disassembles the disk that stores therein the data on the predetermined service (Step S429). Furthermore, the synchronization agent 204 reconstructs the disassembled disk (Step S430). For example, if synchronization is performed with the storage device 300, the synchronization agent 204 performs the setting such that synchronization is performed with the storage device 300 at the time of I/O.

Thereafter, the synchronization agent 204 instructs the virtual machine 13 to resume the I/O (Step S431). Furthermore, the synchronization agent 204 sends a notification that the switching has been completed to the operation management server 41 (Step S432).

As described above, the information processing system according to the embodiment synchronizes the metadata with priority and, after that, synchronizes the file data. Then, the information processing system according to the embodiment performs migration by using the metadata and the file data at the synchronization destination and acquires the metadata that is insufficient in the switching destination from the storage device that was functioned as the synchronization source by the storage device at the switching destination. Then, the storage device at the switching destination at the time of migration acquires the insufficient file data later. Consequently, the backup time can be reduced and, furthermore, the migration time can also be reduced. Furthermore, by acquiring the file data associated with the updated metadata later, the completeness of data at the time of synchronization can be guaranteed. Furthermore, it is possible to have a plurality of backup destinations and, furthermore, each of the storage devices can back up a backup. Consequently, it is possible to secure a plurality of migration destinations, improve the safety, and suppress a backup cost.

Furthermore, the information system described above can also be used not only for one-stop service but also for another configuration as long as a backup is performed and an operation is continued after switching to the storage that has the subject backup. For example, the information system described above may also be used as an information processing system for disaster countermeasure.

According to an aspect of an embodiment of the information processing system, the information processing apparatus, and the information processing apparatus control method disclosed in the present invention, an advantage is provided in that it is possible to implement flexible migration at low cost.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system comprising:
    a first information processing apparatus;
    a second information processing apparatus; and
    an operation management device, wherein
    the first information processing apparatus includes
        a first storage that stores therein operation data in which management data that includes therein update date and time and actual data that is associated with the management data are held, and
        a first processor coupled to the first storage,
    the second information processing apparatus includes
        a second storage, and
        a second processor coupled to the second storage and configured to
        acquire the management data from the first storage at a first frequency and make the second storage store the acquired management data, and
        specify, based on an update history of the management data acquired, the management data that is updated on and after the last acquisition date and time of the actual data stored in the second storage, acquire the actual data associated with the specified management data from the first storage at a second frequency that is lower than the first frequency, and make the second storage store the acquired actual data, and
    the operation management device includes
        a priority storage, and
        a processor coupled to the priority storage and configured to
        switch a read and write process that is performed by using the operation data stored in the first storage such that the read and write process is performed by using the management data and the actual data that are stored in the second storage,
        receive, at the time of migration, a notification indicating that distribution of a synchronization policy has been completed, instruct the first information processing apparatus that is a switching source and the second information processing apparatus that is a switching destination to start the migration, and receive a switching completion notification from the second information processing apparatus that is the switching destination of the migration,
    the first processor is further configured to save an update history of the management data that is stored in the first storage, and
    the second processor is further configured to specify, at the time of switching performed, based on the update history saved and the update history of the management data acquired, the management data that has not been updated and acquire the specified management data,
    the second information processing apparatus includes a synchronization agent that, when the management data that has not been updated is present at the time of the switching, compares a management data update list with a management data update difference, and specifies the management data that is not updated at the time of the switching.

2. The information processing system according to claim 1, further comprising a third information processing apparatus that includes
    a third storage, and
    a third processor coupled to the third storage and configured to
    acquire the management data from the second storage at a third frequency and make the third storage store the acquired management data, and
    specify, based on an update history of the management data acquired, the management data that is updated on and after the last acquisition date and time of the actual data stored in the third storage, acquire the actual data associated with the specified management data from the second storage at a fourth frequency that is lower than the third frequency, and make the third storage store the acquired actual data.

3. The information processing system according to claim 1, wherein
    a plurality number of the second information processing apparatuses is present,
    the priority storage stores therein the priority of each of the second information processing apparatuses, and
    based on the priority, the first frequency and the second frequency that are used are notified to each of the second information processing apparatuses.

4. The information processing system according to claim 1, wherein
    the first frequency corresponds to a frequency of synchronization of metadata when the first information processing apparatus is used as a synchronization source and the second information processing apparatus is used as a synchronization destination, and
    the second frequency corresponds to the frequency of synchronization of file data when the first information processing apparatus is used as the synchronization source and the second information processing apparatus is used as the synchronization destination.

5. An information processing apparatus comprising:
    a processor configured to
    acquire, from a first storage that stores therein operation data in which management data that includes therein update date and time and actual data that is associated with the management data are held, the management data at a first frequency and make a second storage store the acquired management data;
    specify, based on an update history of the management data acquired, the management data that is updated on and after the last acquisition date and time of the actual data stored in the second storage, acquire the actual data associated with the specified management data from the first storage at a second frequency that is lower than the first frequency, and make the second storage store the acquired actual data;
    receive, at the time of migration, a notification indicating that distribution of a synchronization policy has been completed, instruct a first information processing apparatus that is a switching source and a second information processing apparatus that is a switching destination to start the migration, and receive a switching completion notification from the second information processing apparatus that is the switching destination of the migration, the first information processing apparatus is further configured to save an update history of the management data that is stored in the first storage, and the second information processing apparatus is further configured to specify, at the time of switching performed, based on the update history saved and the update history of the management data acquired, the management data that has not been updated and acquire the specified management data, the second information processing apparatus includes a synchronization agent that, when the management data that has not been updated is present at the time of the switching, compares a management data update list with a management data update difference, and specifies the management data that is not updated at the time of the switching.

6. The information processing apparatus according to claim 5, wherein a read and write process that is performed by using the operation data stored in the first storage is performed by using the management data and the actual data that are stored in the second storage.

7. The information processing apparatus according to claim 5, wherein the first storage is provided in another information processing apparatus that acquires, at a third frequency, operation data stored in a third storage that is different from the first storage and the second storage, that makes the first storage store the acquired operation data, that specifies, based on an update history of the management data in the first storage, the management data that is updated on and after the last acquisition date and time of the actual data stored in the first storage, that acquires the actual data associated with the specified management data from the third storage at a fourth frequency that is lower than the third frequency, and that makes the first storage store the acquired actual data.

8. An information processing apparatus control method comprising:

acquiring, from a first storage that stores therein operation data in which management data that includes therein update date and time and actual data that is associated with the management data are held, the management data at a first frequency;

storing, performed by a second storage, the acquired management data;

saving an update history of the management data that is stored in the second storage;

holding the last update date and time on which the actual data acquired from the first storage is made to be stored by the second storage;

specifying, based on the update history, the management data that is updated on and after the last acquisition date and time at a second frequency that is lower than the first frequency, by a processor;

acquiring the actual data associated with the specified management data;

storing, performed by the second storage, the acquired actual data;

receiving, at the time of migration, a notification indicating that distribution of a synchronization policy has been completed, instructing a first information processing apparatus that is a switching source and a second information processing apparatus that is a switching destination to start the migration, and receiving a switching completion notification from the second information processing apparatus that is the switching destination of the migration, the first information processing apparatus is further configured to save an update history of the management data that is stored in the first storage, and the second information processing apparatus is further configured to specify, at the time of switching performed, based on the update history saved and the update history of the management data acquired, the management data that has not been updated and acquire the specified management data, the second information processing apparatus includes a synchronization agent that, when the management data that has not been updated is present at the time of the switching, compares a management data update list with a management data update difference, and specifies the management data that is not updated at the time of the switching.

\* \* \* \* \*